United States Patent
Stevenson

(10) Patent No.: US 7,825,344 B2
(45) Date of Patent: Nov. 2, 2010

(54) REMOTE RACKING OF HORIZONTALLY DISPLACEABLE CIRCUIT BREAKERS

(76) Inventor: Robert L. Stevenson, 2102 N. Forbes Blvd., Suite 101, Tucson, AZ (US) 85745

( * ) Notice: Subject to any disclaimer, the term of this patent is extended or adjusted under 35 U.S.C. 154(b) by 656 days.

(21) Appl. No.: 11/775,122

(22) Filed: Jul. 9, 2007

(65) Prior Publication Data

US 2009/0014291 A1    Jan. 15, 2009

(51) Int. Cl.
*H01H 33/42* (2006.01)
*H01H 9/20* (2006.01)
*H01H 9/24* (2006.01)

(52) U.S. Cl. .................. 200/50.24; 200/50.21

(58) Field of Classification Search ............... 200/50.24
See application file for complete search history.

(56) References Cited

U.S. PATENT DOCUMENTS 5,477,017 A * 12/1995 Swindler et al. ......... 200/50.24
6,897,388 B2 * 5/2005 Greer ......................... 200/200
7,019,230 B1 * 3/2006 Vaill et al. ............... 200/50.24

* cited by examiner

*Primary Examiner*—Renee Luebke
*Assistant Examiner*—Lheiren Mae A Caroc
(74) *Attorney, Agent, or Firm*—Quarles & Brady LLP

(57) ABSTRACT

A system for remotely racking a horizontally movable circuit breaker includes a motor as well as a transmission connectible to the motor and to a racking screw for moving the circuit breaker. The system further includes a mounting bracket for holding the transmission and a controller for controlling the motor from a location remote from the circuit breaker.

22 Claims, 17 Drawing Sheets

REMOTE RACKING OF HORIZONTALLY DISPLACEABLE CIRCUIT BREAKERS

FIELD OF THE INVENTION

The invention relates to the servicing of electrical switchgear.

DESCRIPTION OF THE PRIOR ART

Low-voltage and medium-voltage electrical switchgear typically includes one or more banks of circuit breakers. The circuit breakers are housed in individual cubicles provided with doors, and each circuit breaker is equipped with terminals. Each circuit breaker is movable independently of the others between a "connect" position in which the circuit breaker terminals engage corresponding fixed terminals of the switchgear and a "disconnect" position in which the circuit breaker terminals are out of engagement with the fixed switchgear terminals. Movement of a circuit breaker from the "disconnect" position to the "connect" position is known as "racking-in" while movement of the circuit breaker from the "connect" position to the "disconnect" position is known as "racking-out".

Two types of electrical switchgear are in existence. The circuit breakers of one type are racked in and out by moving them vertically with the assistance of a portable racking motor, and these circuit breakers are elevated in the "connect" position. A circuit breaker of this type is racked out by moving the circuit breaker down to ground level, and the circuit breaker can then be wheeled out of its cubicle. To reconnect the circuit breaker, the latter is wheeled back into the cubicle and racked in by lifting the circuit breaker via the racking motor. In the second type of electrical switchgear, a circuit breaker is racked in and out by moving it horizontally through the agency of a drive screw. Racking in and racking out are accomplished by manually rotating the screw with the assistance of a crank.

When electrical switchgear is in an energized condition, there is a potential for a so-called arc-flash. An arc-flash occurs when current flows through the air between a conductor of the switchgear and ground, and such current flow can be accompanied by extremely high temperatures and pressures which, in turn, can cause objects to be hurled through the air at high velocity. The high temperatures and pressures can result in serious injury or death as can any flying objects produced by these temperatures and pressures.

If work is to be performed on a circuit breaker and/or on the cubicle housing the circuit breaker, the circuit breaker is moved from the "connect" position to the "disconnect" position. For a vertically movable circuit breaker, an operator opens the door of the respective cubicle and places the portable racking motor on a platform inside the cubicle. The operator thereupon connects the motor to a drive mechanism for the circuit breaker and activates the motor to lower the circuit breaker. In the case of a horizontally movable circuit breaker, the operator opens the door of the respective cubicle and manually cranks the circuit breaker drive screw to rack out the circuit breaker. Following completion of the work on a racked-out circuit breaker and/or on the cubicle housing the circuit breaker, the latter is once again racked in.

Conventionally, racking-in and racking-out of a circuit breaker are performed with the door of the respective cubicle open and with the operator in proximity to the cubicle. Since an arc-flash can occur during both racking-in and racking-out, the operator is at risk while performing these procedures.

U.S. Pat. No. 6,777,627 discloses a system which allows remote racking of a circuit breaker. The risk to an operator during racking is virtually eliminated inasmuch as the operator is stationed at a distance from the circuit breaker and its cubicle when the circuit breaker is racked. However, this system is designed solely for vertically racked circuit breakers.

SUMMARY OF THE INVENTION

One aspect of the invention resides in a system for remotely displacing a circuit breaker of a selected type of electrical switchgear having a selected drive member arranged to displace the circuit breaker in accordance with predetermined displacement parameters. The displacing system comprises a motor for driving the selected drive member, and a force-transmitting member which is releasably connectible with the motor. The force-transmitting member is of a selected type adapted to engage the selected drive member so as to transmit force thereto and adapted to remain in engagement with the selected drive member throughout at least the major part of the range of displacement of the circuit breaker. The force-transmitting member is provided with an identifying element for generating a signal identifying the force-transmitting member as being of the selected type of force-transmitting member. The displacing system further comprises a mounting member for mounting the force-transmitting member in a position to engage and transmit force to the selected drive member. The displacing system additionally comprises a control unit responsive to the signal from the force-transmitting member and programmed with the predetermined displacement parameters for the circuit breaker. The control unit is adapted to cause the motor to drive the force-transmitting member based on the predetermined displacement parameters for the circuit breaker.

Some types of circuit breakers are lockable in one or more positions by a locking device. If the circuit breaker is of one of these types, the mounting member can be provided with an unlocking mechanism adapted to be coupled to the locking device. The control unit may then be programmed to cause the unlocking mechanism to unlock the locking device when the unlocking mechanism is coupled to the locking device and the circuit breaker is to be displaced from a locked position. The displacing system can here include a coupling member for coupling the unlocking mechanism to the locking device, and the coupling member may be mountable on the locking device and adapted to be engaged by the unlocking mechanism.

The selected drive member for the circuit breaker may be rotary and, in such an event, the motor and the force-transmitting member are adapted to apply torque to the selected drive member. Under these circumstances, the control unit is advantageously programmed to deactivate the motor when the motor generates a torque in excess of a predetermined value.

The motor and the force-transmitting member can be provided with cooperating coupling elements for transferring torque from the motor to the force-transmitting member. In addition, the motor may be fabricated with a locking element for locking the force-transmitting member to the motor. This locking element can be shiftable relative to the motor, preferably by hand, between a locked position and a released position.

It is preferred that the cooperating coupling elements of the motor and force-transmitting member be designed to prevent the torque on the force-transmitting member from exceeding a predetermined value.

The force-transmitting member can be provided with a sensing device for sensing the distance moved by the circuit breaker.

The selected force-transmitting member may comprise a shaft for engaging and driving the selected drive member for the circuit breaker, and this shaft can be movable in axial direction of the shaft.

The force-transmitting member and the mounting member may be provided with cooperating positioning elements for positioning the force-transmitting member and the mounting member in a predetermined relative position. Additionally, the mounting member can be formed with a locking element for locking the force-transmitting member to the mounting member. The positioning elements are advantageously designed to prevent relative rotation of the force-transmitting member and the mounting member.

The cooperating positioning elements of the force-transmitting member and the mounting member can include at least one positioning element which inhibits a type of force-transmitting member different than the selected type of force-transmitting member from being mounted on the mounting member.

The mounting member may be of a selected type, and the cooperating positioning elements of the force-transmitting member and the mounting member can here include at least one positioning element which inhibits the force-transmitting member from being mounted on a type of mounting member different than the selected type of mounting member.

The mounting member may comprise an attachment element adapted to be fixed to a surface and a holding element for holding the force-transmitting member on the mounting member. Such holding element can be pivotal relative to the attachment element.

The control unit is advantageously provided with a port for downloading software into the control unit.

Another aspect of the invention resides in electrical switchgear comprising a displacing system as outlined above.

An additional aspect of the invention resides in a method of displacing a circuit breaker which is movable by a drive member in accordance with predetermined displacement parameters. The method comprises the step of establishing a connection between the drive member and a force-transmitting member of selected type adapted to drive the drive member. The method further comprises the steps of transmitting a signal from the force-transmitting member identifying the force-transmitting member as being of the selected type, sensing the signal and automatically driving the force-transmitting member in response to the signal based on the predetermined displacement parameters for the circuit breaker. The driving step preferably comprises controlling the force-transmitting member from a location remote from the circuit breaker.

The circuit breaker can be locked in a predetermined position prior to the driving step and, in such an event, the method additionally comprises the step of automatically releasing the circuit breaker prior to the driving step.

The drive member for the circuit breaker may be rotary, and the force-transmitting member and drive member are then subjected to torque during the driving step. Under such circumstances, the method can further comprise the step of automatically interrupting the driving step when the torque on the force-transmitting member exceeds a predetermined value.

The method may also comprise the step of automatically measuring the displacement of the circuit breaker during the driving step.

Additional features and advantages of the invention will become apparent from the following detailed description of certain specific embodiments when read in conjunction with the accompanying drawings.

DESCRIPTION OF THE PREFERRED EMBODIMENTS

Figure 1:
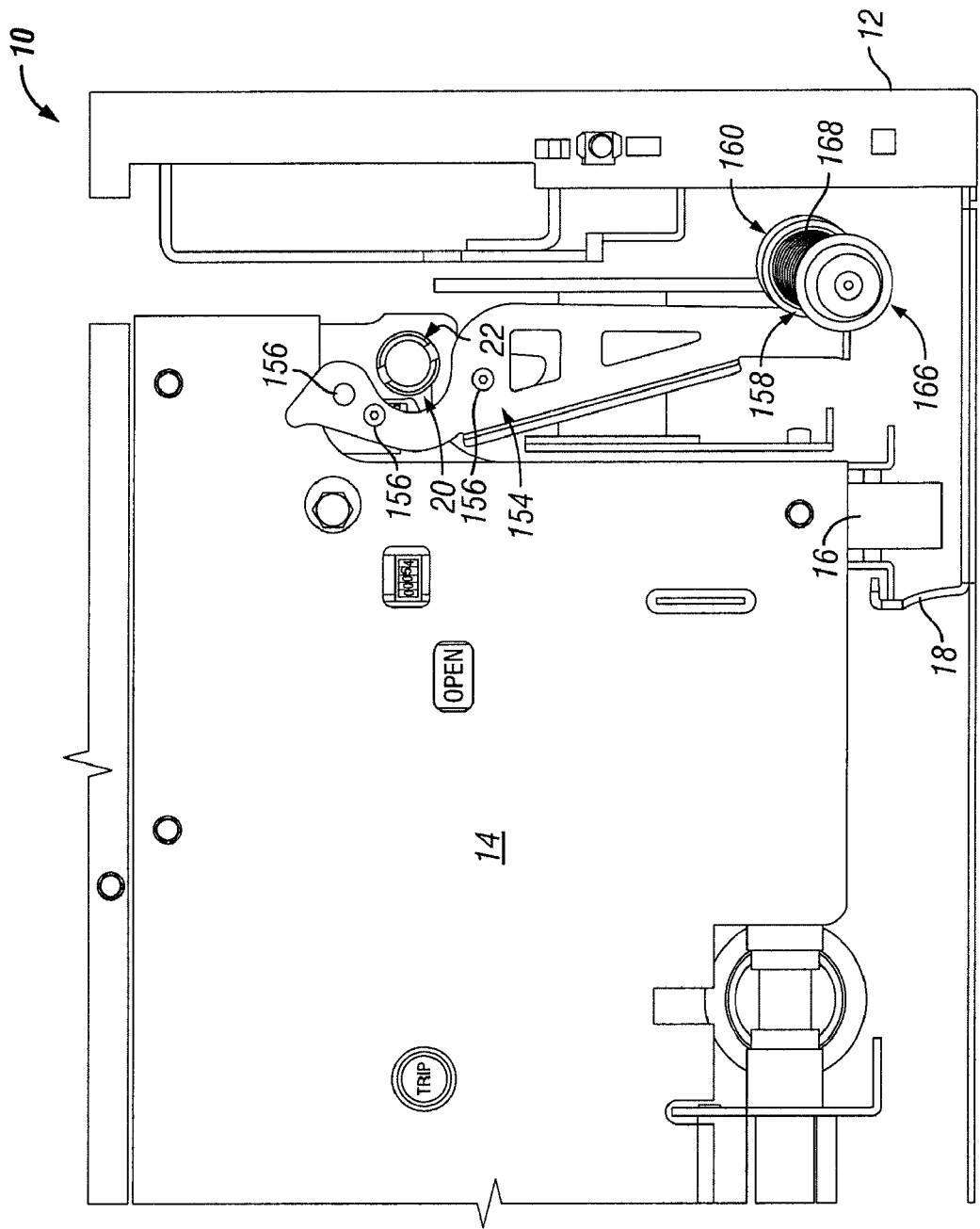
FIG. 1 is a fragmentary front view of a cell of conventional electric switchgear showing a circuit breaker housed in a cubicle and part of a system according to the invention for displacing the circuit breaker.

FIG. 1 shows a segment of conventional electric switchgear. The switchgear consists of one or more banks of identical cells, and FIG. 1 illustrates a section of one such cell. The cell of FIG. 1 is identified by the numeral 10 and includes a cubicle or cabinet 12 which houses a circuit breaker 14. The circuit breaker 14 is provided with non-illustrated terminals and is movable back-and-forth along a horizontal surface S between a "connect" position and a "disconnect" position. The circuit breaker terminals engage non-illustrated fixed terminals of the switchgear when the circuit breaker 14 is in the "connect" position, and the circuit breaker terminals are out of engagement with the fixed terminals when the circuit breaker 14 is in the "disconnect" position. The fixed switchgear terminals are located inside the cubicle 12.

Consistent with accepted terminology, the term "racking-in" in the following description will be understood to mean displacement of the circuit breaker 14 in a direction from the "disconnect" position towards the "connect" position. Similarly, the term "racking-out" will be understood to mean displacement of the circuit breaker 14 in a direction from the "connect" position towards the "disconnect" position.

The circuit breaker 14 is racked out and racked in horizontally along the surface S, and the circuit breaker 14 is mounted for movement on rollers or casters 16 (only one visible in the drawings) and is guided during movement by rails 18 (again, only one visible in the drawings). The cell 10 comprises a racking or drive member 20 for racking the circuit breaker 14, and the racking member 20 is here in the form of a screw.

The cubicle 12 has a door which can be swung open and closed, and the door is open in FIG. 1 and not visible. The racking screw 20 has an end which faces the cubicle door when the latter is closed, and this end of the racking screw 20 is provided with two diametrically opposed notches 22. The notches 22 are designed to be engaged by a handheld crank which enables an operator to rack the circuit breaker 14 manually, and the door of the cubicle 12 is provided with an opening for insertion of the crank while the door is closed.

The switchgear of FIG. 1 constitutes but one of many different types of switchgear with different types of horizontally racked circuit breakers.

To manually rack the circuit breaker 14, an operator must be stationed adjacent to the cubicle 12. Furthermore, the cubicle door 26 must be open during at least part of a racking procedure. Hence, an operator is exposed to substantial risk of injury or death should an arc-flash occur during racking.

Figure 2:
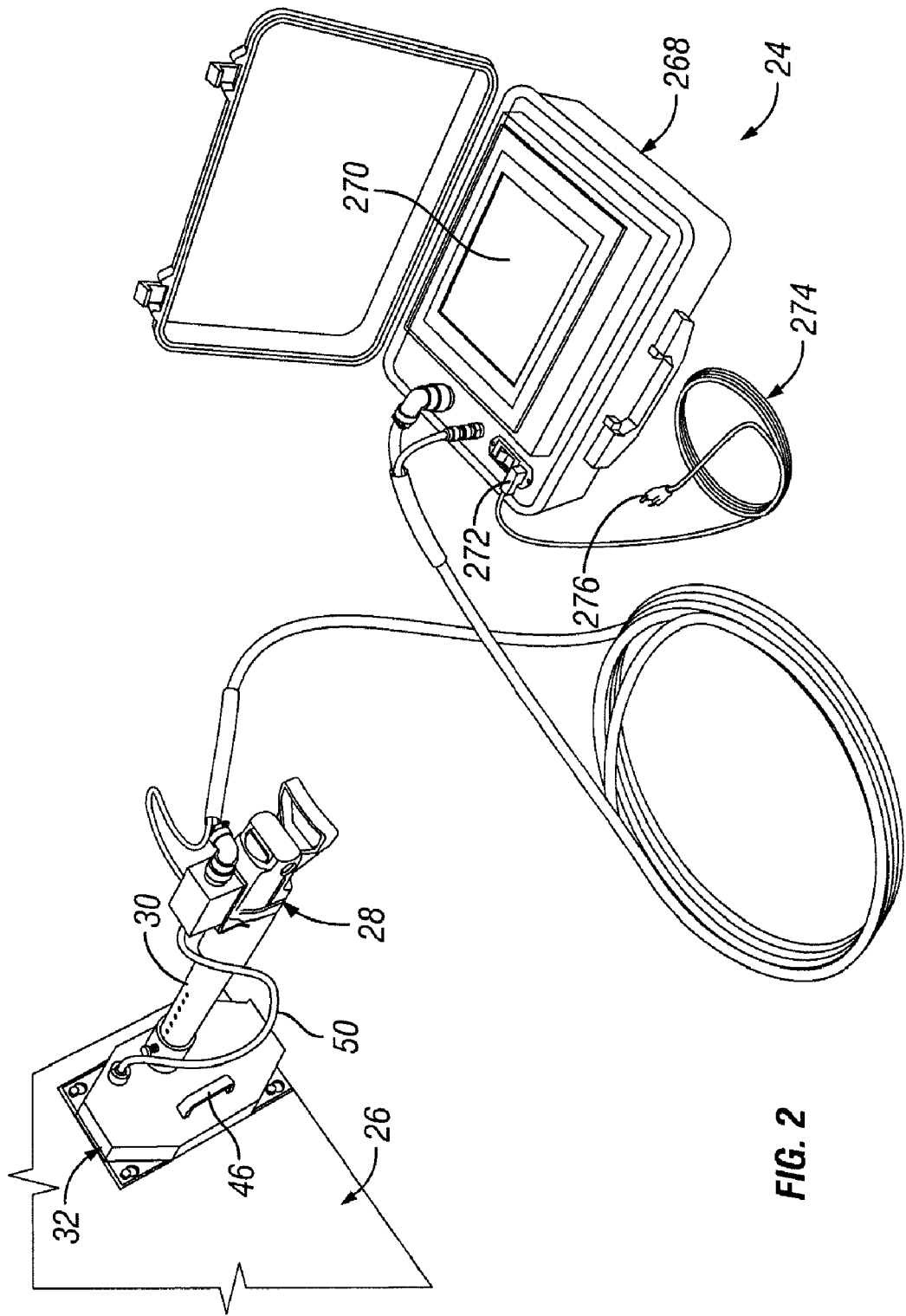
FIG. 2 shows additional components of the circuit breaker displacing system partially illustrated in FIG. 1.

FIG. 2 illustrates a racking system 24 which permits an operator to rack the circuit breaker 14 while the operator is stationed at a location remote from the cubicle 12. The door of the cubicle 12 is closed in FIG. 2 and denoted by 26, and the racking system 24 also allows the operator to rack the circuit breaker 14 with the cubicle door 26 closed. Since the racking system 24 enables the operator to be removed from the cubicle 12, and the cubicle door 26 to be closed, during racking of the circuit breaker 14, the risk of injury or death can be virtually eliminated.

The racking system 24 includes an electric motor 28 for driving the racking screw 20 and a transmission or force-transmitting member 30 for transferring force from the motor 26 to the racking screw 20. The racking system 24 further includes a mounting bracket or mounting member 32 which functions to mount the transmission 30 on the cubicle door 26 in a position to engage and drive the racking screw 20.

Figure 3:
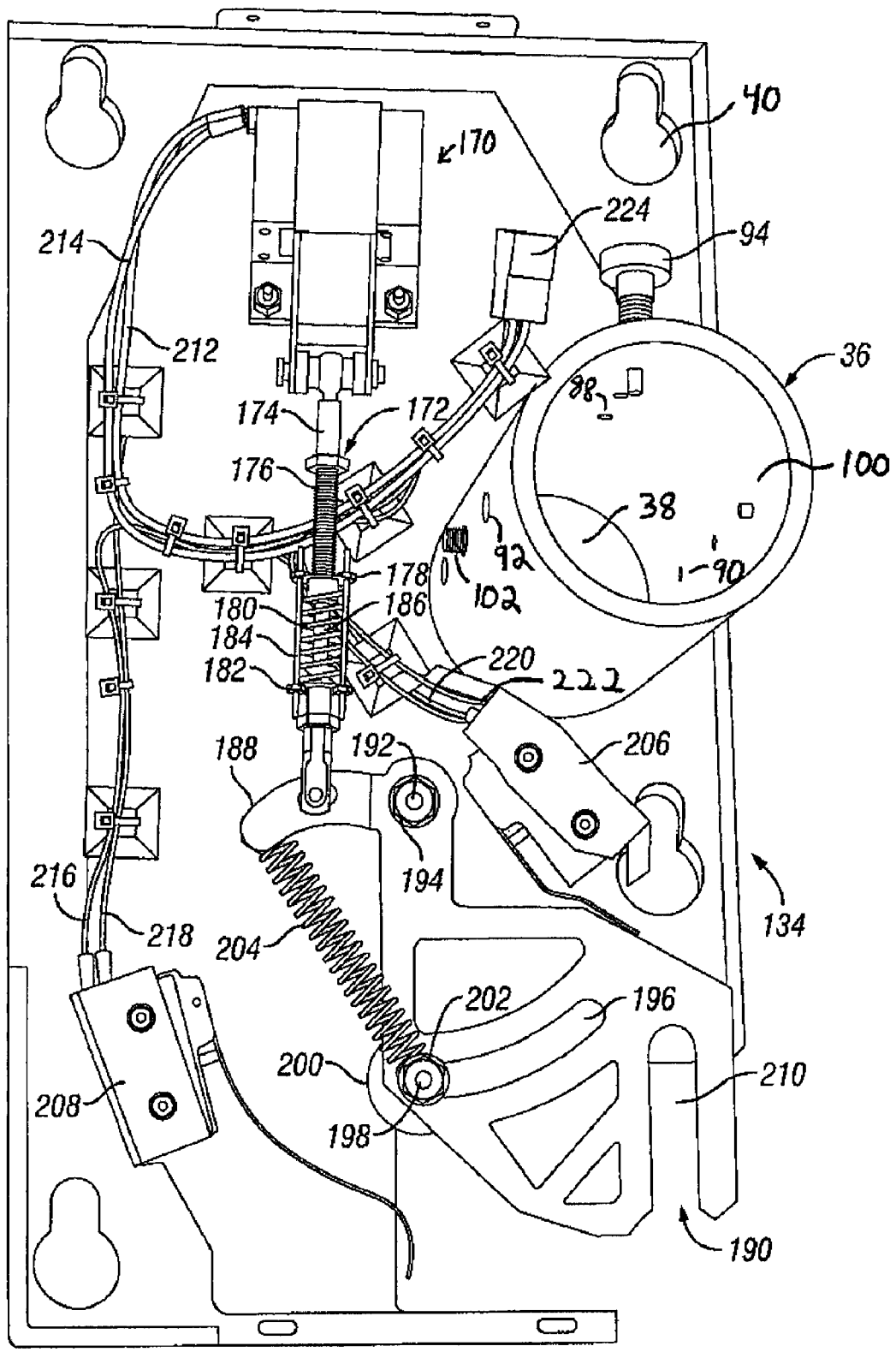
FIG. 3 is a perspective view of the inside of a mounting bracket constituting part of the circuit breaker displacing system of FIGS. 1 and 2.
Figure 4:
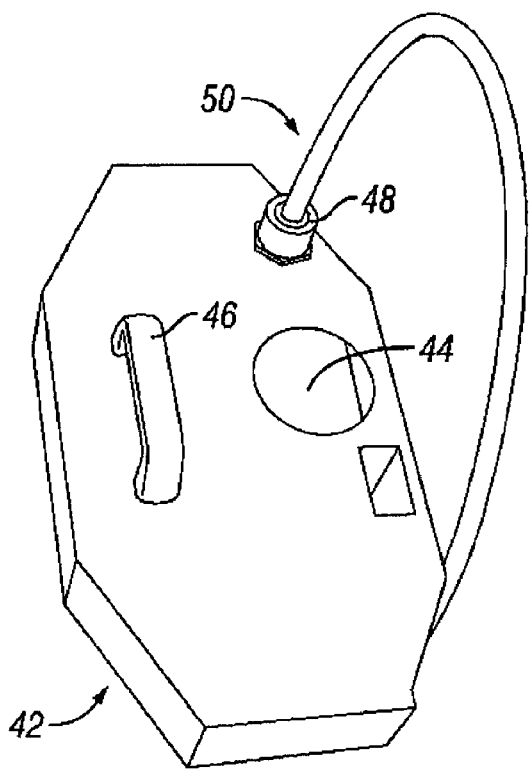
FIG. 4 is a perspective view of a cover forming part of the mounting bracket of FIG. 3.

Turning to FIGS. 3 and 4, the mounting bracket 32 comprises a flat plate or attachment element 34 and a carrier or holding element 36 in the form of a collar or tube of circular cross section. The longitudinal axis of the collar 36 is normal to the plane of the plate 34. The plate 34 is provided with an opening 38 which is coaxial with the collar 36, and the opening 38 is designed to be aligned with the opening which is formed in the cubicle door 26 for the purpose of accessing the racking screw 20. The plate 34 is further provided with holes 40 for mounting the plate 34 on the cubicle door 26. The collar 36 is designed to receive and grip a portion of the transmission 30 and to hold the transmission 30 so that the latter can engage and drive the racking screw 20.

The mounting bracket 32 additionally comprises a cover 42 which is designed to overlie the plate 34 when the plate 34 is affixed to the cubicle door 26, and the cover 42 is formed with an opening 44 for the collar 36. The cover 42 has a surface which faces away from the cubicle door 26 when the cover 42 sits on the door 26, and such surface is provided with a handle 46. A tubular element 48 of circular cross section projects from this surface and registers with a non-illustrated hole in the cover 42, and an automation or actuation cable 50 extends through the tubular element 48 and the cover 42.

Figure 5:
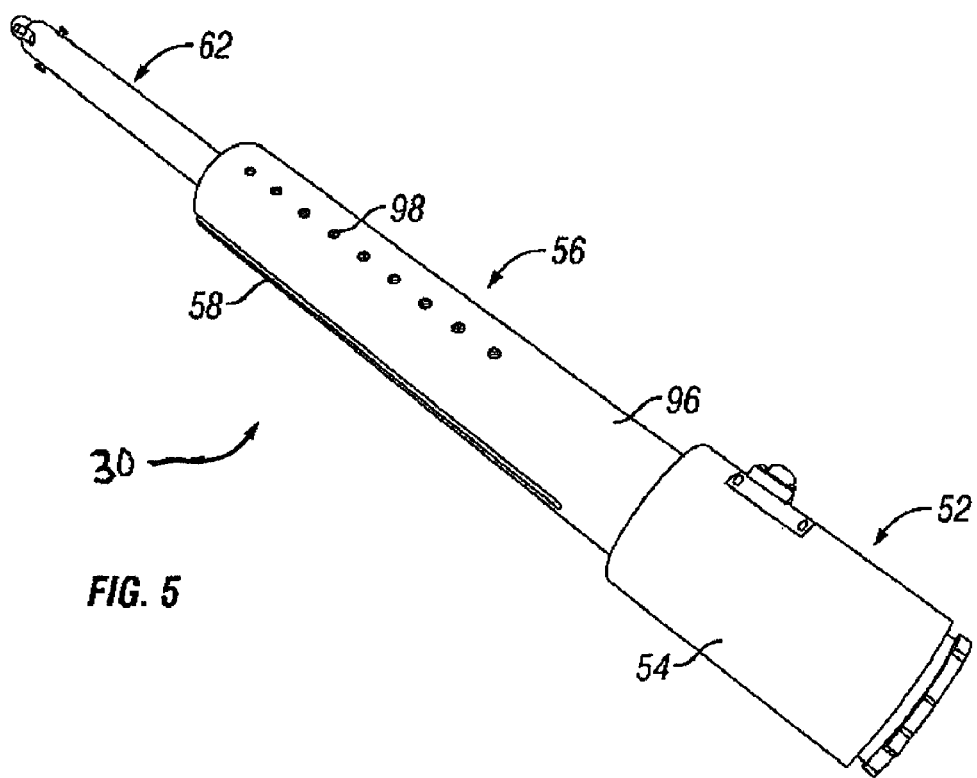
FIG. 5 is a perspective view of a transmission having two stages and constituting part of the circuit breaker displacing system of FIGS. 1 and 2.

Considering FIG. 5, the transmission 30 includes an elongated universal stage or section 52 having a casing or body 54 and an elongated specialized stage or section 56 having a casing or body 58. The universal transmission stage 52 and specialized transmission stage 56 have mating ends which are joined to one another by a quick-disconnect coupling, and the universal transmission stage 52 and specialized transmission stage 56 are locked against relative rotation by a locking element such as, for example, a locking pin or locking screw.

The casing 58 of the specialized transmission stage 56 has an end remote from the universal transmission stage 52, and a rotary shaft 62 projects from this end of the casing 58. The specialized transmission shaft 62 extends lengthwise of the specialized transmission stage 54 and is rotatable relative to the casing 58.

As mentioned earlier, the racking screw 20 of FIG. 1 has two diametrically opposed notches 22 designed to be engaged by a handheld crank for manual racking of the circuit breaker 14. The end of the specialized transmission shaft 62 remote from the specialized transmission casing 58 is provided with a non-illustrated member, e.g., a pin, which can be received by the notches 22 in order to establish a drive connection between the transmission 30 and the racking screw 20.

Figure 6:
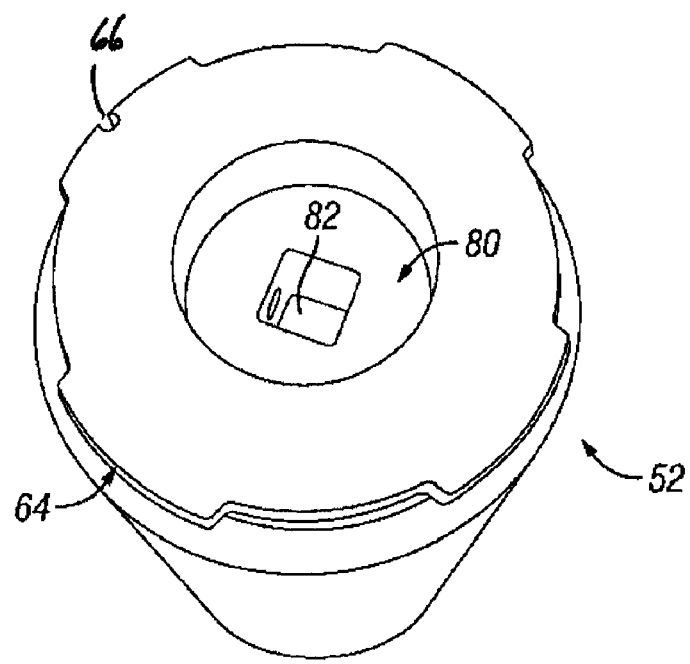
FIG. 6 is a perspective view of an end of the transmission of FIG. 5 showing coupling elements for coupling the transmission to a motor forming part of the system of FIGS. 1 and 2.

The universal transmission stage 52 has an end remote from the specialized transmission stage 56 and, as illustrated in FIG. 6, such end is provided with several spaced projections 64 which are uniformly distributed circumferentially of the universal transmission stage 52. One of the projections 64 is formed with a notch 66.

Figure 7:
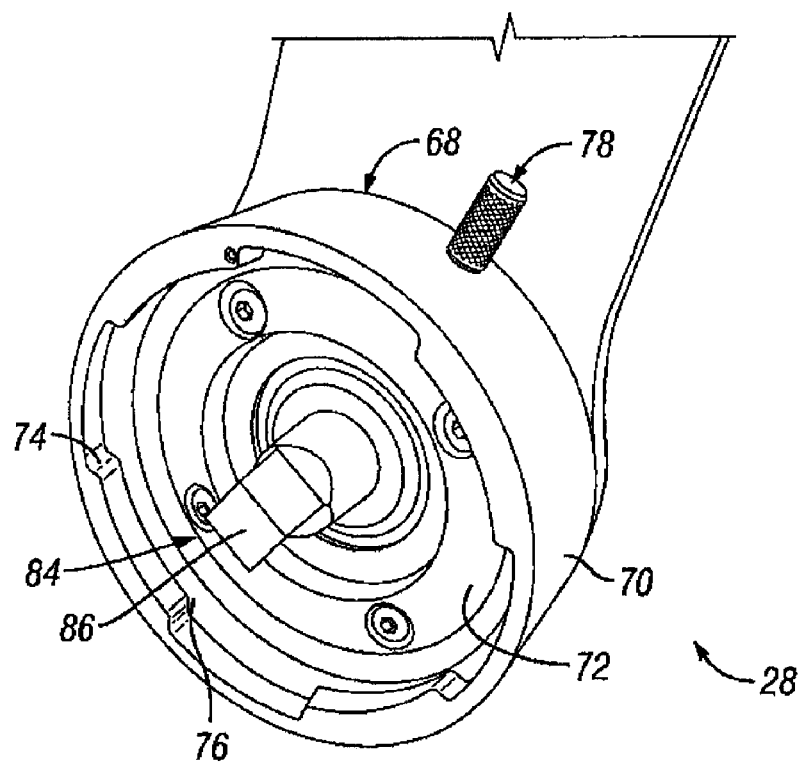
FIG. 7 is a perspective view of an arrangement on the motor for coupling the transmission of FIG. 5 to the motor.

Referring to FIG. 7 in conjunction with FIG. 6, the racking motor 28 is designed to form a quick-disconnect coupling with the universal transmission stage 52. To this end, the racking motor 28 is provided with a coupling section 68 which includes a hollow cylindrical element 70 of circular cross section. The hollow cylindrical element 70 has an open end which is designed to confront the universal transmission stage 52 and an opposite end which adjoins an annular end surface 72 of the racking motor 28. Several spaced projections 74 are formed on the internal peripheral surface of the hollow cylindrical element 70, and the projections 74 are uniformly distributed circumferentially of the hollow cylindrical element 70. The number of projections 74 is the same as the number of projections 64 on the universal transmission stage 52. Neighboring ones of the projections 74 are spaced from one another by a distance large enough for the projections 64 of the universal transmission stage 52 to pass between neighboring projections 74. Each of the projections 74 defines a gap 76 with the annular end surface 72 of the racking motor 28, and the gaps 76 are designed to receive respective ones of the projections 64 on the universal transmission stage 52.

To join the racking motor 28 and the universal transmission stage 52, the projections 64 of the universal transmission stage 52 are aligned with respective ones of the spaces between neighboring projections 74 of the racking motor 28. The projections 64 of the universal transmission stage 52 are passed between the projections 74, and brought into contact with the annular end surface 72, of the racking motor 28. The projections 64 of the universal transmission stage 52 are thereupon caused to enter the gaps 76 between the projections 74 and the annular end surface 72 of the racking motor 28 by rotating the universal transmission stage 52 relative to the racking motor 28.

The projections 64 of the universal transmission stage 52 and the projections 74 of the racking motor 28 form a quick-disconnect coupling, and the projections 64,74 can be considered to constitute cooperating coupling elements for joining the racking motor 28 and the universal transmission stage 52 to one another.

The quick-disconnect coupling for connecting the universal transmission stage 52 and the specialized transmission stage 54 to each other can be designed in the same manner as the quick-disconnect coupling for the racking motor 28 and the universal transmission stage 52.

The racking motor 28 is provided with a locking element 78 for preventing relative rotation of the racking motor 28 and the universal transmission stage 52. The locking element 78 is here in the form of a pin which passes through the hollow cylindrical element 70 radially thereof. The locking pin 78 projects to the interior of the hollow cylindrical element 70 and has an enlarged head on the exterior of the hollow cylindrical element 70. The locking pin 78 is slidable between a locked position and a released position in a slot which is formed in the hollow cylindrical element 70 and extends in axial direction thereof. The slot is not visible in FIG. 7 since it is located behind the locking pin 78.

The locking pin 78 is receivable in the notch 66 of the universal transmission stage 52 when the latter is coupled to the racking motor 28. In the locked position of the locking pin 78, the locking pin 78 projects into the notch 66 and prevents the racking motor 28 and the universal transmission stage 52 from rotating relative to one another. When the locking pin 78 is in the released position, the locking pin 78 is clear of the notch 66 and the racking motor 28 and universal transmission stage 52 are free to undergo relative rotation.

A non-illustrated biasing element, e.g., a spring, urges the locking pin 78 towards the locked position. The biasing element and the locking pin 78 are designed so that the locking pin 78 can be manually moved from the locked position to the released position by a finger of an operator, especially a thumb.

The universal transmission stage 52 comprises a mechanical torque limiter 80 which runs lengthwise of the universal transmission stage 52 on the axis of the casing 54 thereof. The mechanical torque limiter 80 has an end surface which is arranged to face the racking motor 28 when the latter is coupled to the universal transmission stage 52, and a recess 82 of square cross section is formed in this end surface of the mechanical torque limiter 80.

The racking motor 28 has a rotary drive shaft 84 which is located on the axis of the hollow cylindrical element 70, and the drive shaft 84 is provided with an end portion 86 of square cross section designed to be received in the recess 82 of the mechanical torque limiter 80. When the racking motor 28 is connected to the universal transmission stage 52, the motor shaft end portion 86 extends into the universal transmission recess 82. The motor shaft end portion 86 and the universal transmission recess 82 then cooperate to establish a drive connection between the motor shaft 84 and the mechanical torque limiter 80. This drive connection enables the motor shaft 84 to subject the mechanical torque limiter 80 to torque.

The motor shaft end portion 86 and the universal transmission recess 82 are designed so that the motor shaft end portion 86 begins to ratchet when the torque on the mechanical torque limiter 80 reaches a predetermined value. The torque at which the motor shaft end portion 86 begins to ratchet is below that which can damage the transmission 30, and the transmission 30 is thus protected from damage in the event of a malfunction.

The motor shaft end portion 86 and the universal transmission recess 82 can be considered to constitute cooperating connecting or coupling elements for establishing a drive connection between the racking motor 28 and the transmission 30.

The mechanical torque limiter 80 forms a drive connection with the specialized transmission shaft 62. Such drive connection allows the mechanical torque limiter 80 to transmit torque from the motor shaft 84 to the specialized transmission shaft 62.

As illustrated in FIG. 2, when the racking system 24 is in use, the door 26 of the switchgear cell 10 is closed and the mounting bracket 32 is fixed to the door 26 with the collar 36 on the outside. The collar 36 is horizontal and is positioned so that the notches 22 in the racking screw 20 of FIG. 1 face the collar 36. The casing 58 of the specialized transmission stage 56 is received by the collar 36, and the non-illustrated tool on the specialized transmission shaft 62 engages the notches 22. The universal transmission stage 52 is disposed to the outside of the door 26 externally of the collar 36, and the racking motor 28 is coupled to and supported by the universal transmission stage 52.

Returning to FIG. 3, the collar 36 is formed with a row of unthreaded openings 88 as well as two diametrically opposed rows of threaded openings 90 and 92. A locking element 94, which is here in the form of a pin, is mounted in one of the openings 88 and is movable between a locked position and a released position. The locking pin 94 projects into the interior of the collar 36 in the locked position and is clear of the interior of the collar 36 in the released position. The casing 58 of the specialized transmission stage 56 has a non-illustrated opening which receives the locking pin 94 when the casing 58 is properly positioned in the collar 36. The locking pin 94, which is urged towards the locked position by a non-illustrated biasing element such as a spring, functions to prevent rotation of the casing 58 as well as movement of the casing 58 axially of the collar 36.

Considering FIG. 5 together with FIG. 3, the casing 58 of the specialized transmission stage 56 has two diametrically opposed grooves 96 (only one visible in the drawings) running lengthwise of the casing 58. A row of threaded holes 98 is located in each of the grooves 96, and a non-illustrated screw is screwed into one of the holes 98 of each row. A screw 100 is screwed into one of the openings 90 of the collar 36 while a screw 102 is screwed into one of the threaded holes 92 of the collar 36. The screws 100,102 project into the interior of the collar 36.

When the transmission 30 is mounted in the collar 36, the screw 100 on the collar 36 is received in one of the grooves 96 of the transmission 30 and the screw 102 on the collar 36 is received in the other of the grooves 96. The screws 100,102 and the non-illustrated screws in the threaded holes 98 of the transmission 30 help to properly position the transmission 30 in the collar 36 and the screws 100,102 also help to prevent rotation of the transmission 30. In addition, the screws 100, 102 and the non-illustrated screws in the threaded holes 98 of the transmission 30 have another function.

As mentioned previously, the switchgear of FIG. 1 is but one of many different types of switchgear with different types of horizontally racked circuit breakers. Switchgear different from that of FIG. 1 will generally require a transmission different from the transmission 30 and a mounting bracket different from the mounting bracket 32. The screws 100,102 on the collar 36 prevent a transmission different from the transmission 30 from being mounted on the collar 36. Similarly, the screws in the threaded holes 98 of the transmission 30 prevent the latter from being mounted on a mounting bracket different from the mounting bracket 32. The screws 100,102 and the non-illustrated screws in the threaded holes 98 of the transmission 30 can accordingly be referred to as rejection screws.

The collar 36 may be fast with the plate 34 of the mounting bracket 32 or can be mounted on the plate 34 by way of a gimbal. A gimbal is of advantage in that it allows the transmission 30 to adjust to deviations of the circuit breaker 14 from a linear path.

The racking screw 20 of FIG. 1 moves axially as it is rotated to displace the circuit breaker 14. Accordingly, the specialized transmission shaft 62 must be not only rotatable relative to the specialized transmission casing 58 but axially shiftable relative thereto as well.

Figure 8:
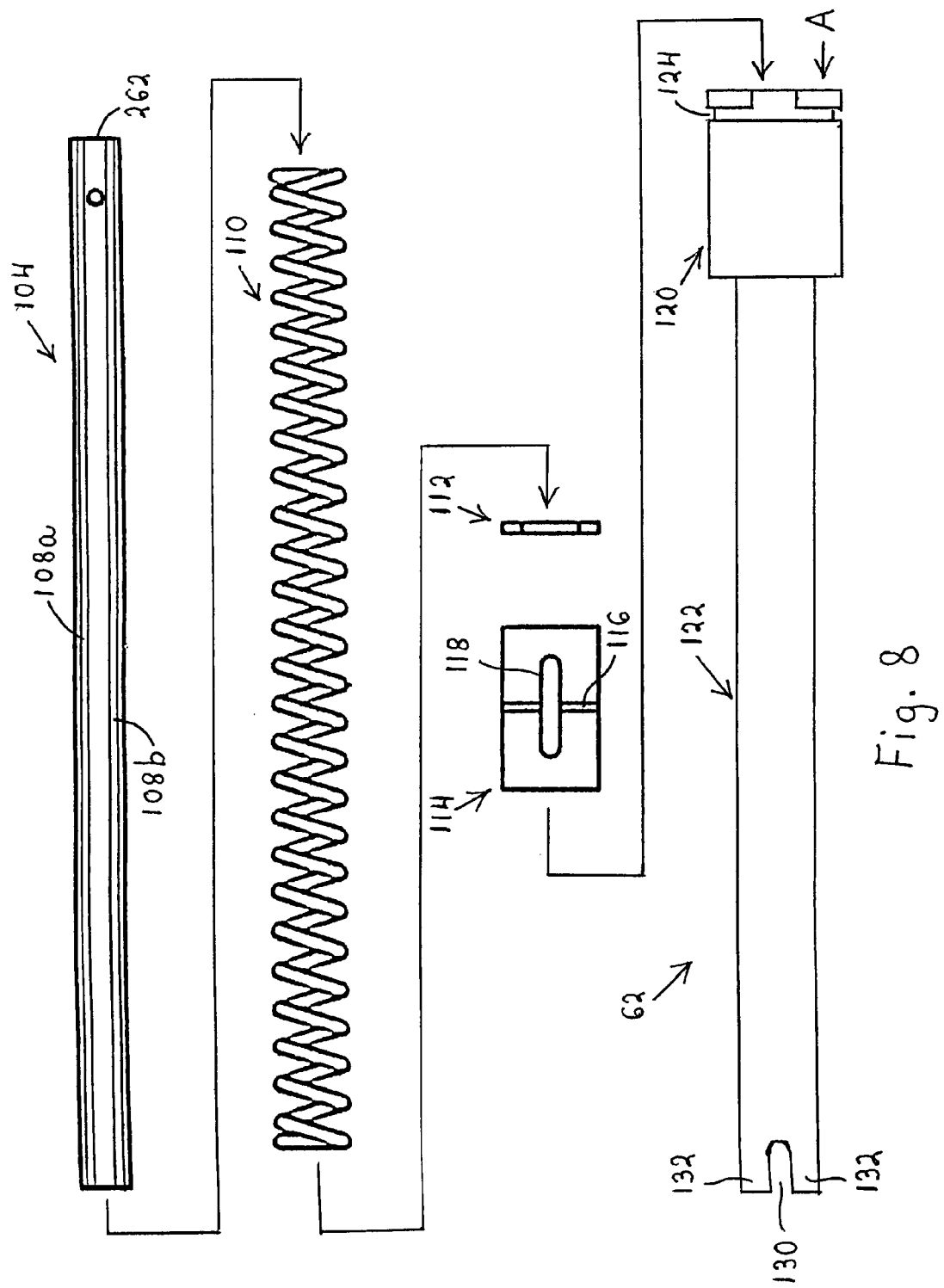
FIG. 8 is an exploded view showing components of one stage the transmission of FIG. 5.
Figure 10:
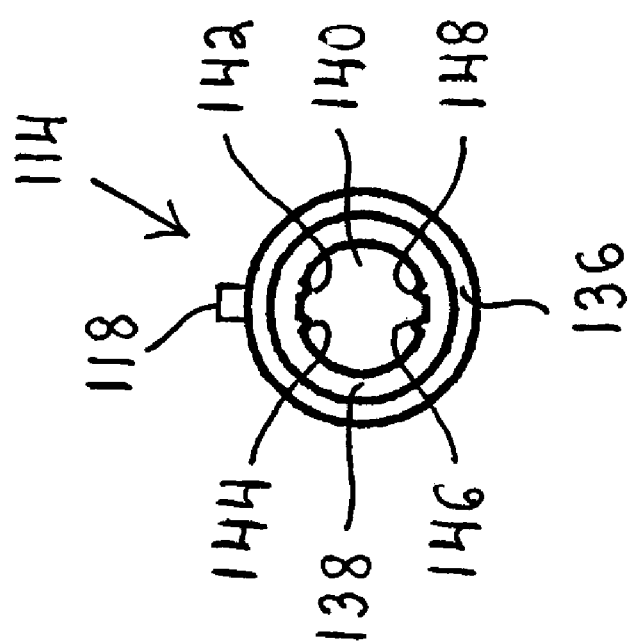
FIG. 10 is an end view of a linear rotary bearing illustrated in FIG. 8.
Figure 9:
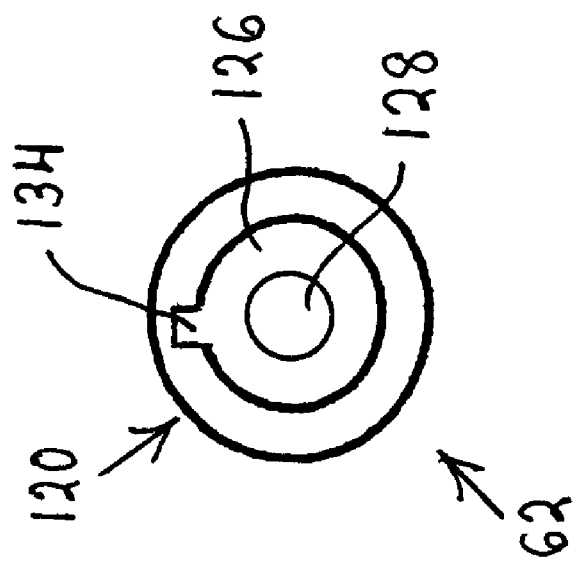
FIG. 9 is an end view of an output shaft illustrated in FIG. 8 as seen in the direction of the arrow A in FIG. 8.

FIGS. 8, 9 and 10 illustrate an arrangement for mounting the specialized transmission shaft 62 in the specialized transmission casing 58 so that the specialized transmission shaft can rotate and move axially. This arrangement includes an input shaft 104 of solid circular cross section which is designed to be coupled to the mechanical torque limiter 80 of the universal transmission stage 52. The input shaft 104 is formed with four grooves which run the length of the input shaft 104. Only two of the grooves are visible and these are identified by the numerals 108a and 108b.

The input shaft 104 extends through an elongated thrust spring 110 having one end which bears against a non-illustrated abutment located in the region of the juncture between the specialized transmission stage 56 and the universal transmission stage 52. The other end of the thrust spring 110 bears against a thrust washer 112 which, in turn, abuts one end of an elongated linear rotary bearing 114. The linear rotary bearing 114 is provided with an annular groove midway along its length, and a retaining ring 116 having an aperture sits in the groove. The aperture receives a pin on a linear bearing key 118, and the pin is a friction fit in the aperture. The pin and the aperture function to firmly seat the linear bearing key 118 on the linear rotary bearing 114. The linear bearing key 118 is elongated and runs lengthwise of the linear rotary bearing 114.

The specialized transmission shaft 62, which can be referred to as an output shaft of the specialized transmission stage 56, is of circular cross section and includes a section 120 of larger diameter and a section 122 of smaller diameter. The larger section 120, which is provided with an annular groove 124 for a seal, rides inside the specialized transmission casing 58 and is provided with a passage 126 of larger diameter as seen in FIG. 9. The smaller section 122 extends from the interior of the specialized transmission casing 58 to the exterior thereof and is provided with a passage 128 of smaller diameter also seen in FIG. 9. The diameter of the passage 128 of the smaller section 122 exceeds the diameter of the input shaft 104, and the passage 128 registers with and can receive the shaft 104.

The smaller section 122 of the specialized transmission shaft 62 has an end remote from the larger section 120, and such end has a cutout 130 which is bounded on two sides by a pair of diametrically opposed legs 132. The legs 132 may be provided with registering passages capable of holding a pin which is receivable in the notches 22 of the racking screw 20 of FIG. 1.

The passage 126 of the larger section 120 of the specialized transmission shaft 62 receives the linear rotary bearing 114. As illustrated in FIG. 9, an elongated keyway or groove 134 running lengthwise of the larger section 120 is formed internally thereof and is designed to accommodate the linear bearing key 118 of the linear rotary bearing 114. The keyway 134 and the linear bearing key 118 couple the linear rotary bearing 114 and the specialized transmission shaft 62 so that the linear rotary bearing 114 can transfer torque to the shaft 62.

At the junction between the larger section 120 and the smaller section 122 of the specialized transmission shaft 62, a shoulder is formed internally of the passage 126 of the larger section 120. The end of the linear rotary bearing 114 remote from the thrust spring 110 abuts this shoulder.

Considering FIG. 10, the linear rotary bearing 114 comprises a nut or outer casing 136 and a retainer 138 internally of the nut 136. The nut 136 and the retainer 138 are fixed against movement relative to one another. The retainer 138, which defines a passage 140 for the input shaft 104, holds a straight row of balls 142, a straight row of balls 144, a straight row of balls 146 and a straight row of balls 148. The balls 142, 144, 146, 148 project into the passage 140 for the input shaft 104.

When the input shaft 104 is inserted in the passage 140, the balls 142 enter the groove 108a of the shaft 104 and the balls 144 enter the groove 108b. Similarly, the balls 146 enter one of the non-illustrated grooves of the shaft 104 while the balls 148 enter the other of the non-illustrated grooves. The grooves and the balls 142, 144, 146, 148 couple the input shaft 104 and the linear rotary bearing 114 so that the shaft 104 can transmit torque to the linear rotary bearing 114. Furthermore, the grooves and the balls 142, 144, 146, 148 allow the specialized transmission shaft 62 to move back-and-forth axially on the input shaft 104.

The arrangement of FIGS. 8, 9 and 10 thus enables the specialized transmission shaft 62 to transfer torque from the input shaft 104 to the racking screw 20 of FIG. 1 and, at the same time, track the axial movements of the racking screw 20.

As indicated previously, the thrust spring 110 bears against the thrust washer 112 which, in turn, abuts one end of the linear rotary bearing 114. The opposite end of the linear rotary bearing 114 bears against the shoulder formed internally of the larger section 120 of the specialized transmission shaft 62 at the junction between the larger section 120 and the smaller section 122. The thrust spring 110 is in compression and accordingly urges the linear rotary bearing 114 into abutment with the shoulder. As a result, the specialized transmission shaft 62 is biased towards the racking screw 20 of FIG. 1 and is able to stay in engagement therewith even when the racking screw 20 moves axially away from the input shaft 104.

Figure 11:
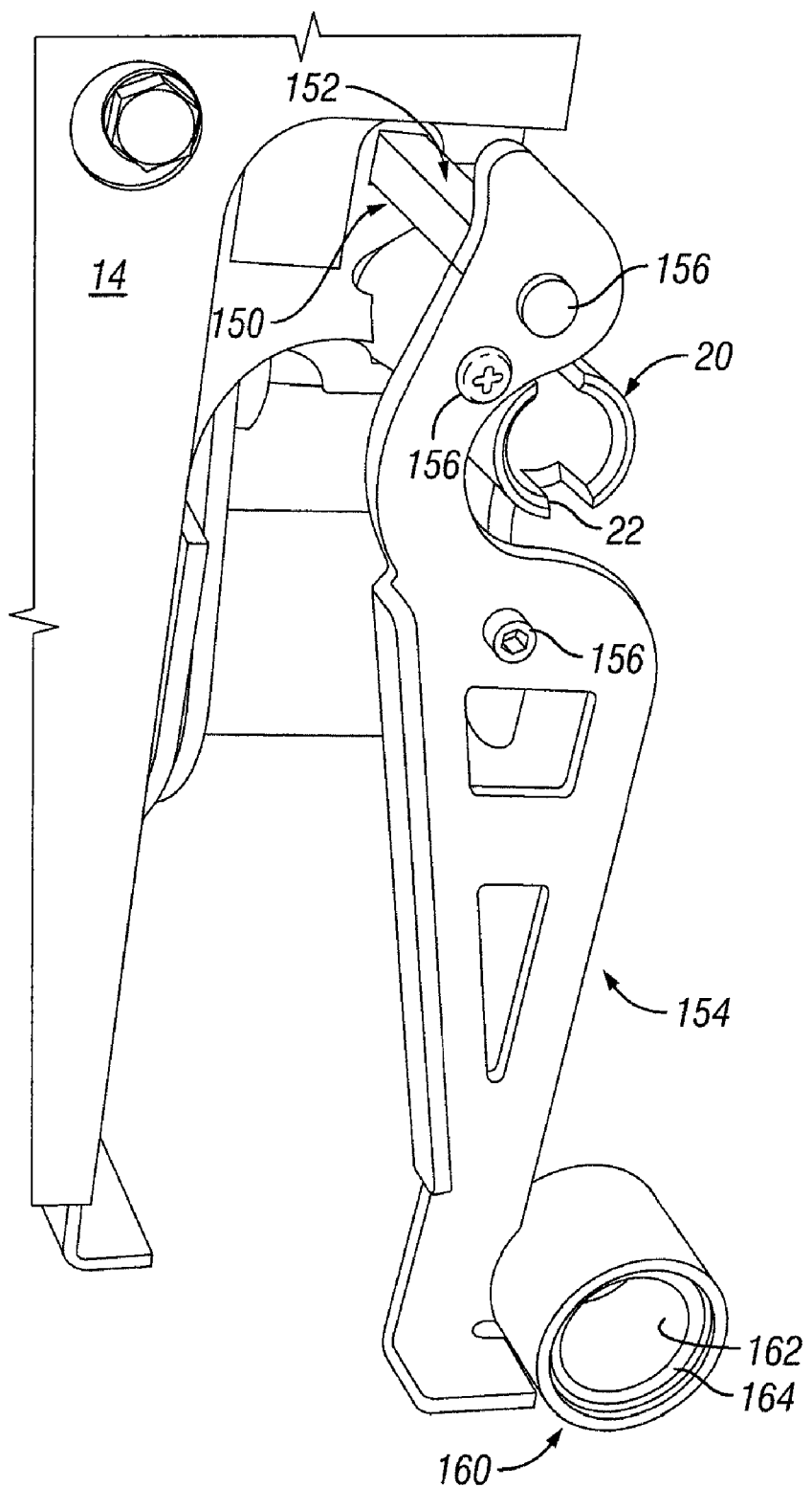
FIG. 11 is similar to FIG. 1 but shows additional details of the switchgear of FIG. 1 and the circuit breaker displacing system of FIGS. 1 and 2.

Turning to FIG. 11, the circuit breaker 14 is provided with a positive interlock which prevents the racking screw 20 from moving when the circuit breaker 14 is in specific positions. In the present case, these positions are the "connect" position, the "disconnect" position and a "test" position between the "connect" and "disconnect" positions. The positive interlock, which can be referred to as a locking or arresting device, includes a bar 150 which runs parallel to and alongside the racking screw 20. The bar 150 carries a non-illustrated pin which is fast with the bar 150 and projects from the latter transverse thereto. The racking screw 20 is formed with three non-illustrated arresting openings which are spaced from one another lengthwise of the screw 20, and the pin on the bar 150 is receivable in the openings to arrest the screw 20. One of the arresting openings in the racking screw 20 corresponds to the "connect" position, a second to the "disconnect" position and the third to the "test" position.

The bar 150 is pivotal on its axis between an engaged or locked position, a disengaged or released position and an intermediate position. In the engaged position, the non-illustrated pin on the bar extends into one of the arresting openings of the racking screw 20. The pin is clear of the racking screw 20 in the released position and rests on the external periphery of the screw 20 in the intermediate position. A non-illustrated biasing element constantly urges the bar 150 towards the engaged position.

The bar 150 has an end which faces the door 26 of the cubicle 12 housing the circuit breaker 14 when the door 26 is closed. This end of the bar 150 is provided with a handle 152 for pivoting the bar 150 from the engaged position to the disengaged position.

When the circuit breaker 14 is in the "connect" position, the "disconnect" position or the "test" position and is to be racked manually, an operator must pivot the bar 150 to its disengaged position using the handle 152. Pivoting of the bar 150 to the disengaged position causes the pin on the bar 150 to be withdrawn from the arresting opening of the racking screw 20 occupied by the pin. While holding the bar 150 in the disengaged position, the operator must then rotate the racking screw 20 until the arresting opening vacated by the pin on the bar 150 is no longer in alignment with the pin. The operator may thereupon let go of the handle 152 on the bar 150, and the bar 150 now pivots to its intermediate position under the action of the non-illustrated biasing element acting on the bar 150. The pin on the bar 150 comes to rest on the external periphery of the racking screw 20 and rides on the external periphery until the pin is again aligned with an arresting opening of the screw 20.

The racking system 24 eliminates the need for an operator to pivot the bar 150 to its engaged position by hand.

As seen in FIGS. 1 and 11, the racking system 24 comprises a lever or coupling member 154 which is elongated vertically and has opposed upper and lower ends. The upper end of the lever 154 is fixed to the handle 152 of the bar 150 via appropriate connecting elements 156. On the other hand, the lower end of the lever 154 is fixed to an elongated extension or connecting member 158 which projects horizontally from the lever 154 in a direction away from the circuit breaker 14.

The extension 158 comprises a sleeve 160 which is fixed to the lower end of the lever 154. To this end, as best seen in FIG. 11, the outer periphery of the sleeve 160 may be provided with a cutout so as to produce flat surfaces which can sit flush against flat surfaces of the lever 154. The sleeve 160 can, for example, be fixed to the lever 154 by welding.

The sleeve 160 has a passage 162 which runs axially of the sleeve 160, and a collar 164 is fixedly mounted inside the passage 162 in a circumferential groove formed in the internal surface of the sleeve 160. The collar 164 supports a non-illustrated rod or shaft which projects from the passage 162 through the end of the sleeve 160 facing away from the circuit breaker 14. The rod is held by the collar 164 such that the sleeve 160 can slide along the rod and the rod can rotate relative to the sleeve 160.

The rod has an end remote from the circuit breaker 14, and a flanged roller 166 is mounted on this end of the rod. The roller 166 comprises two flanges which are spaced from one another axially of the roller 166 and cooperate to define a groove.

A spring or biasing member 168 encircles the rod and bears against the collar 164 and the roller 166.

The door 26 of the cubicle 12 housing the circuit breaker 14 is provided with a non-illustrated opening for the extension 158. During use of the racking system 24, the cubicle door 26 is closed and the extension 158 projects through the door 26 to a location near the lower end of the mounting bracket 42. When the extension 158 is in its proper operating position and is viewed from above or below, the flanged roller 166 of the extension 158 lies between the cubicle door 26 and the cover 42 of the mounting bracket 32.

Returning to FIG. 3, the plate 34 of the mounting bracket 32 carries an actuating mechanism for pivoting the bar 150 of the positive interlock for the circuit breaker 14 from its locked position to its released position. This actuating mechanism includes a solenoid 170 having a movable core, and a linkage 172 which is coupled to the movable core. The linkage 172 comprises a cylinder 174 and a piston rod 176 projecting from one end of the cylinder 174. The other end of the cylinder 174 is attached to the movable core of the solenoid 170.

The linkage 172 further comprises a jam suspension 178 which includes an abutment 180 fixed to the plate 34 of the mounting bracket 32 and an abutment 182 which is movable towards and away from the fixed abutment 180. The fixed abutment 180 has an opening in register with an opening in the movable abutment 182, and the piston rod 176 passes through these openings. The movable abutment 182 is mounted on the piston rod 176 for movement therewith.

The fixed abutment 180 and movable abutment 182 are joined to one another by two tie rods or guide rods 184 located on diametrically opposite sides of the piston rod 176. The tie rods 184 help guide the movable abutment 182 during movement.

A return spring or biasing member 186 is mounted on the piston rod 176 between the fixed abutment 180 and the movable abutment 182.

The end of the piston rod 176 remote from the cylinder 174 is connected to an arm 188 of an interlock operating lever or member 190. The interlock operating lever 190 is pivotal on a threaded pivot 192 which is fast with the plate 34 of the mounting bracket 32. The threaded pivot 192 has an end remote from the plate 34, and a locknut 194 is screwed onto this end of the pivot 192. The interlock operating lever 190 is held between the plate 34 and the locknut 194 which cooperate to confine the lever 190.

The interlock operating lever 190 is provided with a curved slot 196, and a threaded guide rod 198 extends into the slot 196. The guide rod 198 is held against movement, and one or more washers functioning as spacers are situated on the guide rod 198. Only one washer is visible in FIG. 3, and such washer is identified by the numeral 200 and lies against the interlock operating lever 190. The guide rod 198 has an end on the side of the interlock operating lever 190 remote from the washer 200, and a locknut 202 is screwed onto this end of the guide rod 198. The interlock operating lever 190 is held between the washer 200 and the locknut 202 which cooperate to confine the lever 190.

The guide rod 198 and the curved slot 196 of the interlock operating lever 190 serve to guide the lever 190 as it pivots.

During pivotal movement, the interlock operating lever 190 slides between the washer 200 and the locknut 202.

The arm 188 of the interlock operating lever 190 has a free end, and one end of an elongated travel assist spring or biasing member 204 is anchored to the free end of the arm 188. The other end of the travel assist spring 204 is anchored to the guide rod 198.

The interlock operating lever 190 is pivotal between an inoperative position shown in FIG. 3 and an operative position. When the interlock operating lever 190 is in its inoperative position, the positive interlock for the circuit breaker 14 is engaged and the circuit breaker 14 is prevented from moving. On the other hand, the positive interlock for the circuit breaker 14 is disengaged in the operative position of the interlock operating lever 190 and the circuit breaker 14 is free to move. In FIG. 3, the interlock operating lever 190 pivots clockwise during movement from the inoperative position to the operative position and counterclockwise during movement from the operative position to the inoperative position.

The interlock operating lever 190 abuts a position contact 206 when the lever 190 is in its inoperative position. Similarly, in the operative position of the interlock operating lever 190, the lever 190 abuts a position contact 208.

The interlock operating lever 190 is provided with a straight slot 210 which is designed to receive the flanged roller 166 of the extension 158. When the flanged roller 166 is properly seated in the slot 210, the portion of the interlock operating lever 190 adjacent to the slot 210 is located between the flanges of the roller 166.

Assuming that the interlock operating lever 190 engages the flanged roller 166 of the extension 158 and that the lever 190 is in the inoperative position of FIG. 3, the actuating mechanism for the positive interlock associated with the circuit breaker 14 operates as follows:

The interlock operating lever 190 abuts the position contact 206 which generates a signal indicating that the lever 190 is in its inoperative position and that the positive interlock is engaged. Since the positive interlock is engaged, the circuit breaker 14 is held against movement.

If the circuit breaker 14 is to be displaced, a signal is transmitted to the solenoid 170. In response to this signal, the solenoid 170 is energized and the movable core of the solenoid 170 shifts in a direction away from the interlock operating lever 190. The cylinder 174 is drawn along with the movable core of the solenoid 170 and, in turn, pulls the piston rod 176 with it. Consequently, the movable abutment 182 on the piston rod 176 is displaced towards the fixed abutment 180 thereby compressing the return spring 186.

Furthermore, as the piston rod 176 is pulled along with the cylinder 174, the piston rod 176 exerts a pull on the arm 188 of the interlock operating lever 190. This causes the interlock operating lever 190 to pivot clockwise on the pivot 192 away from the position contact 206 and towards the position contact 208. During pivotal movement of the interlock operating lever 190, the lever 190 is guided by the guide rod 198, the curved slot 196, the washer 200 and the locknut 202.

In addition to causing the interlock operating lever 190 to pivot, the pull exerted by the piston rod 176 on the arm 188 of the lever 190 causes the travel assist spring 204 to stretch and be placed in tension.

Since the flanged roller 166 of the extension 158 is received in the straight slot 210 of the interlock operating lever 190, the lever 190 draws along the roller 166 as the lever 190 pivots. Due to the fact that the extension 158 containing the flanged roller 160 is affixed to the lever 154 of FIG. 11, the lever 154 pivots in response to displacement of the roller 160 by the interlock operating lever 190. Such pivoting of the lever 154 causes the positive interlock for the circuit breaker 14 to become disengaged thereby freeing the circuit breaker 14 for movement.

When the positive interlock for the circuit breaker 14 is disengaged, the interlock operating lever 190 abuts the position contact 208. The position contact 208 generates a signal indicating that the positive interlock has been disengaged and the racking screw 20 of FIGS. 1 and 11 is rotated in response to this signal to shift the circuit breaker 14.

As indicated earlier, the positive interlock for the circuit breaker 14 includes a non-illustrated pin which is receivable in arresting openings of the racking screw 20 to prevent rotation of the screw 20. When the interlock operating lever 190 pivots from the inoperative position of FIG. 3 to its operative position, the pin is withdrawn from the arresting opening currently occupied by the pin. As the racking screw 20 is rotated following withdrawal of the pin from the arresting opening, the arresting opening and the pin are shifted relative to one another so that they are no longer in alignment.

Once the arresting opening and the pin are no longer in alignment, a signal is sent to the solenoid 170 to deenergize the latter. Upon deenergization of the solenoid 170, the movable core of the solenoid 170 no longer exerts a pull on the cylinder 174, the piston rod 176 and the arm 188 of the interlock operating lever 190. Accordingly, the interlock operating lever 190 is free to pivot counterclockwise from the position contact 208 back towards the position contact 206. Pivoting of the interlock operating lever 190 back towards the position contact 206 takes place under the action of the travel assist spring 204 which was placed in tension upon energization of the solenoid 170 and under the action of the return spring 186 which was compressed upon energization of the solenoid 170.

The flanged roller 166 of the extension 158 is carried along by the interlock operating lever 190 as the latter travels back towards the position contact 206. Consequently, the positive interlock for the circuit breaker 14 moves from its disengaged position back towards its engaged position through the agency of the extension 158 and the lever 154 of FIGS. 1 and 11. At this time, however, the non-illustrated pin of the positive interlock is not in alignment with one of the arresting openings in the racking screw 20. Thus, the pin comes to rest on the external surface of the racking screw 20 and rides on such surface until the pin comes into register with an arresting opening. The pin is thereupon urged into the arresting opening and the positive interlock is once again engaged.

As noted above, the return spring 184 of FIG. 3 helps pivot the interlock operating lever 190 from the position contact 208 back towards the position contact 206 once the solenoid 170 has been deenergized. In addition, the return spring 184 draws the movable core of the solenoid 170 back to its original position following deenergization of the solenoid 170. In the absence of the return spring 184, the movable core would be unable to return to its original position if the interlock operating lever 190 jammed while moving from the position contact 208 back towards the position contact 206. Under such circumstances, the solenoid 170 could burn up.

Figure 12:
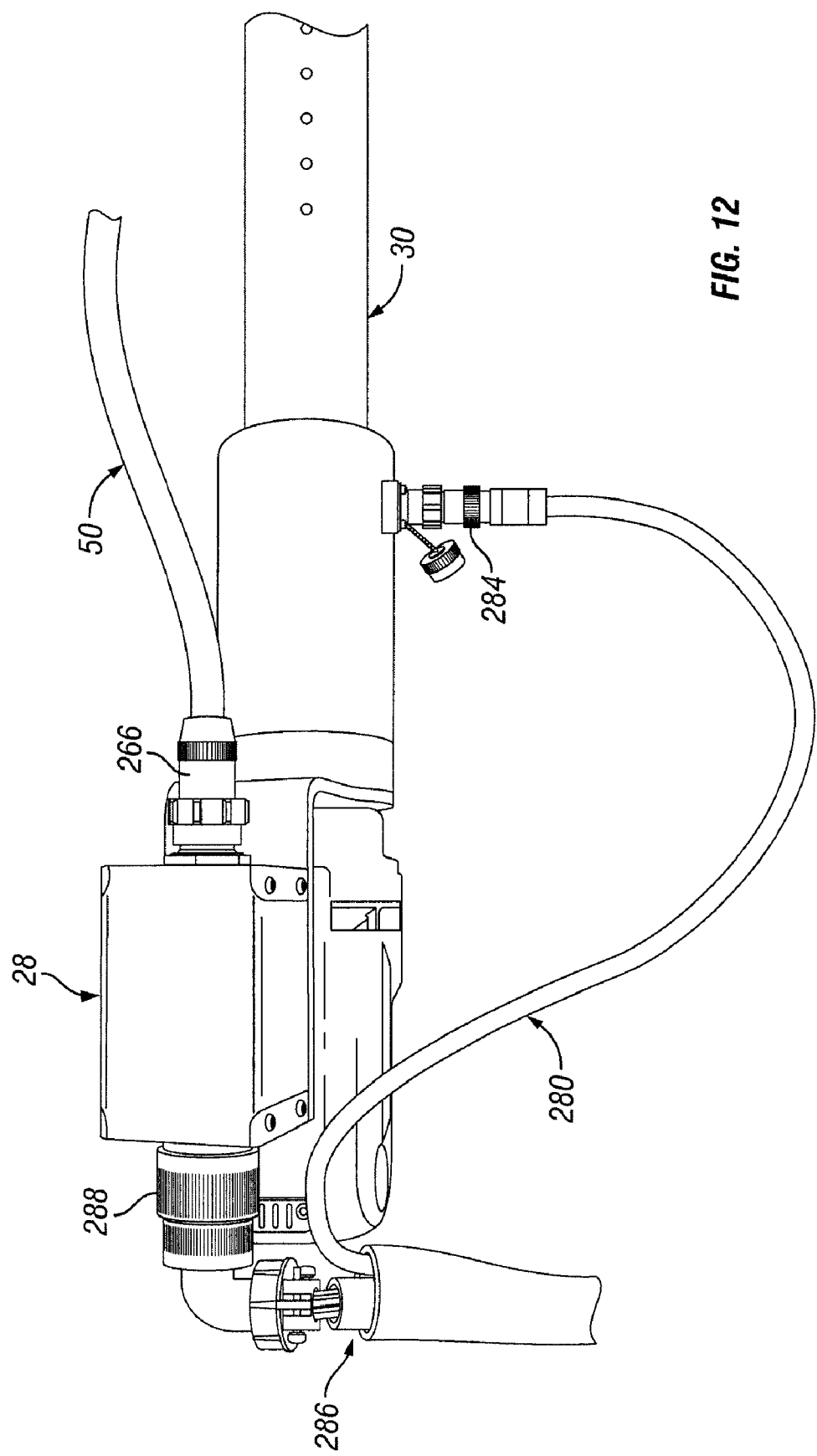
FIG. 12 is a perspective view of the transmission of FIG. 5 joined to the motor of FIG. 6 and illustrates the connection of various cables to the transmission and the motor.

FIG. 3 shows that the solenoid 170 is connected to a pair of electrical conductors 212 and 214. The position contact 206 is connected to a pair of electrical conductors 216 and 218 while the position contact 208 is connected to a pair of electrical conductors 220 and 222. All of the electrical conductors 212, 214, 216, 218, 220, 222 are further connected to a connector 224 which is designed to be coupled to a non-illustrated connector on the automation cable 50 of FIG. 4. A second connector 266 on the automation cable 50 is designed to be plugged into the motor 28 of the racking system 24 as illustrated in FIG. 12.

Figure 13:
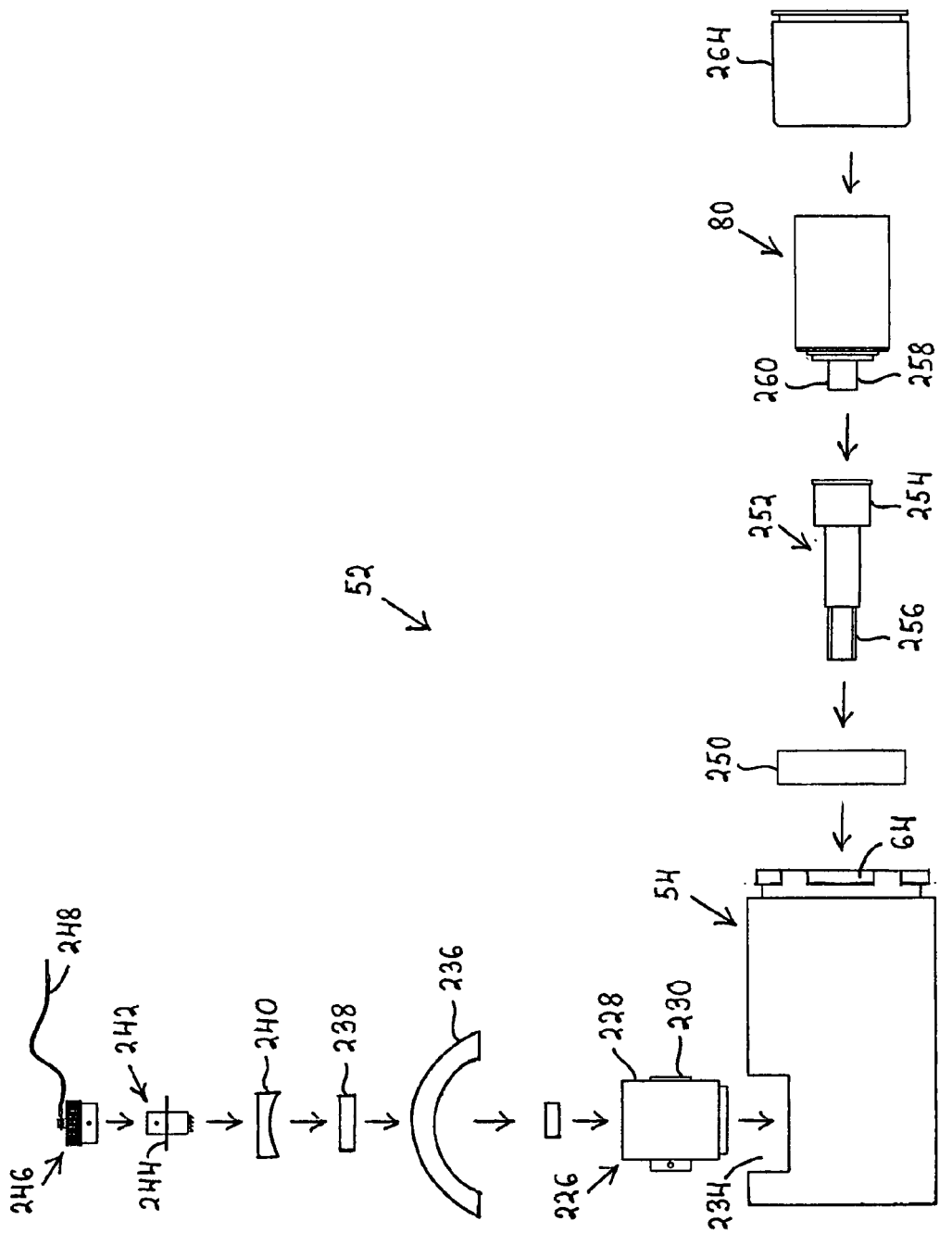
FIG. 13 is an exploded view showing components of the second stage of the transmission of FIG. 5.

Referring to FIG. 13, the universal transmission stage 52 comprises a digital encoder or sensing device 226 which is mounted inside the casing 54 of the universal transmission stage 52. The digital encoder 226 includes a housing 228 which is fixed to the casing 52 and a bushing or sleeve 230 extending through the housing 228. The bushing 230 is rotatable relative to the housing 228. A retainer 232 holds the digital encoder 226 in the housing 228.

The casing 54 is circular in end view, and the outer periphery of the casing 54 is provided with a recess 234 which extends partway around the casing 54. The recess 234 opens into a non-illustrated compartment which is formed internally of the casing 54 and accommodates the digital encoder 226. A curved cover 236 serves to close the recess 234.

The universal transmission stage 52 further comprises a remote identification generator or identifying element 238 which is designed to generate a signal unique to the particular type of the transmission 30. Thus, this signal identifies the particular type of the transmission 30 as well as the particular type of electrical switchgear for which the transmission 30 can be employed.

The remote identification generator 238 is held in place by a base or holding member 240. A digital communications connector 242 passes through the base 240, the remote identification generator 238 and the curved cover 236 into the recess 234 of the casing 54. The digital communications connector 242 has a flange 244 which rests on the base 240. A protective cover 246 for the digital communications connector 242 is provided with a flexible cord 248 which can be attached to the base 240.

A bearing 250 is mounted inside the casing 54 and supports an output shaft 252 for rotation. The output shaft 252 extends through and is secured to the bushing 230 of the digital encoder 226, and the digital encoder 226 senses rotation of the shaft 252 and generates digital signals representing the number of revolutions of the shaft 252. These digital signals are sent to the digital communications connector 242.

The output shaft 252 has an end portion 254 which faces the mechanical torque limiter 80 and an opposite end portion 256 which faces away from the mechanical torque limiter 80. The end portion 254 of the output shaft 252 has a non-illustrated recess of square cross section, and the mechanical torque limiter 80 is provided with a stub 258 of square cross section which is received in the recess. The recess cooperates with the stub 258 to establish a drive connection between the output shaft 252 and the mechanical torque limiter 80. A non-illustrated slot extending longitudinally of the output shaft 252 is formed in the peripheral surface bounding the square recess in the shaft 252, and the slot accommodates a pin 260 projecting from the stub 258 of the mechanical torque limiter 80.

Considering FIG. 8 together with FIG. 13, the input shaft 104 of the specialized transmission stage 56 has an end 262 which faces the end portion 256 of the output shaft 252 forming part of the universal transmission stage 52. The end portion 256 of the output shaft 252 has a square cross section, and at least part of the end portion 256 is located externally of the casing 54 of the universal transmission stage 52. Such part of the end portion 256 is received in a non-illustrated recess of square cross section formed in the end 262 of the input shaft 104. This recess cooperates with the end portion 256 to establish a drive connection between the output shaft 252 of the universal transmission stage 52 and the input shaft 104 of the specialized transmission stage 56.

A retainer 264 shown in FIG. 13 serves to confine the mechanical torque limiter 80 in the casing 54. The mechanical torque limiter 80 is received by the retainer 264 which, in turn, is inserted in the casing 54 and secured thereto.

Figure 14:
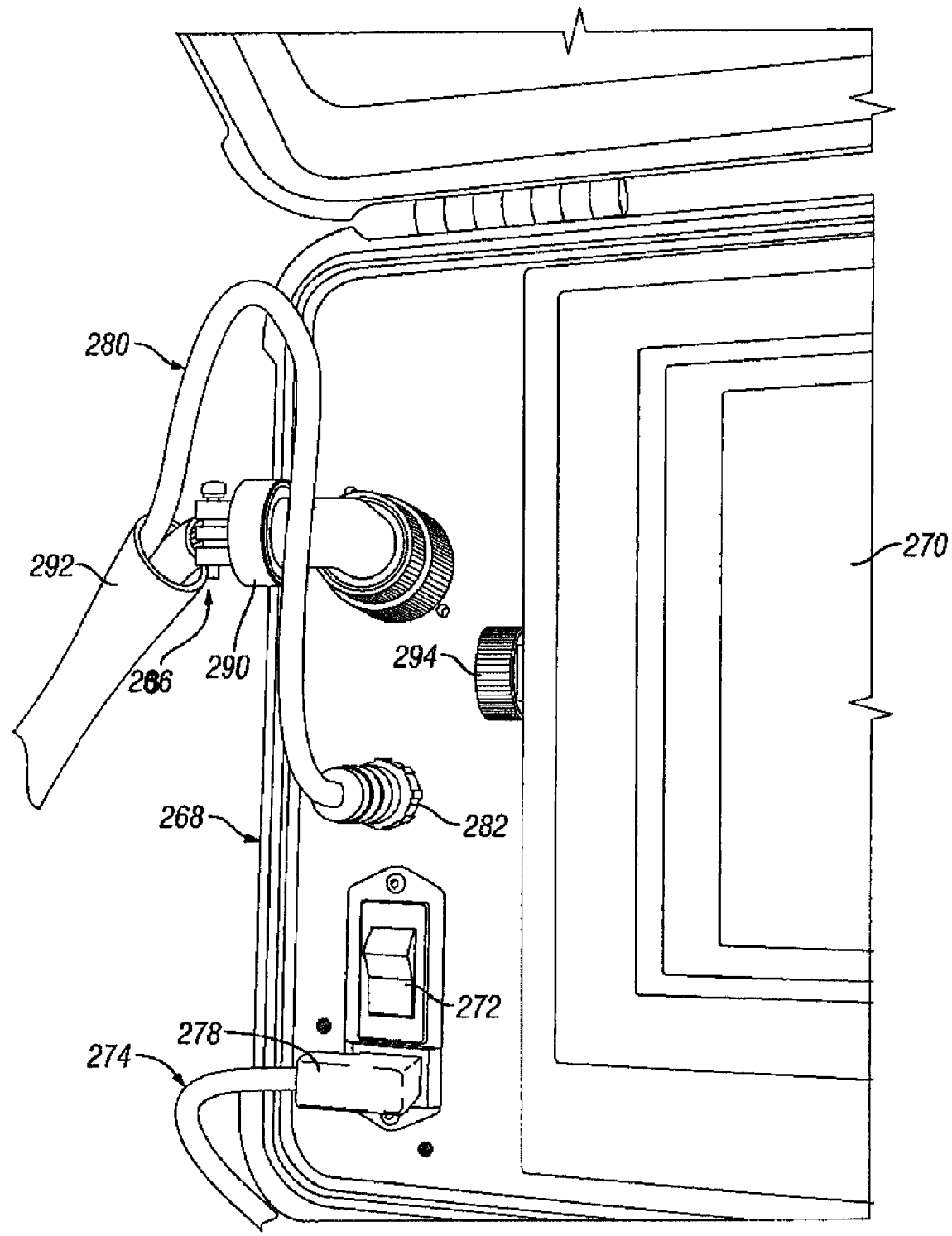
FIG. 14 is a fragmentary perspective view of a controller constituting part of the circuit breaker displacing system of FIGS. 1 and 2 and illustrates the connection of various cables to the controller.

Considering FIG. 2 in conjunction with FIGS. 12 and 14, the racking system 24 additionally comprises a controller or control unit 268 provided with a screen 270 and an on/off switch 272. The controller 268 receives power through a power cable 274, and the power cable 274 has a plug 276 designed to be plugged into a standard, non-illustrated outlet. A second plug 278 of the power cable 274 is designed to be plugged into the controller 268.

A sensing cable 280 runs from the controller 268 to the transmission 30. The sensing cable 280 is provided with a connector 282 for connecting the sensing cable 280 to the controller 268, and the sensing cable 280 is further provided with a connector 284 for connecting the sensing cable 280 to the digital communications connector 242 of the transmission 30. The sensing cable 280 functions to deliver signals from the digital encoder 226 and the remote identification generator 228 to the controller 268.

A drive power cable 286 extends from the motor 28 to the controller 268. The drive power cable 286 has a connector 288 for connecting the drive power cable 286 to the motor 28, and the drive power cable 286 additionally has a connector 290 for connecting the drive power cable 286 to the controller 268. The drive power cable 286 serves to supply the motor 28 with electrical power for operation.

The sensing cable 280 and drive power cable 286 each have a relatively great length so that, when the circuit breaker 14 is to be racked, the controller 268 can be placed far enough away from the breaker 14 to prevent injury to an operator of the controller 268 should an arc-flash occur.

The sensing cable 280 and drive power cable 286 are preferably encased by a common sheath 292.

The controller 268 is programmed with data on the type of electric switchgear to be racked by the racking system 24. This data includes the manufacturer of the switchgear, one or more pictures of a cell and the operating parameters for racking a circuit breaker. The operating parameters comprise information on the displacement of a circuit breaker during racking. For example, in the type of electric switchgear shown in FIGS. 1, 2 and 11, a circuit breaker is shiftable from a "connect" position to a "test" position, from the "test" position to a "disconnect" position, and vice versa. Under such circumstances, the controller 268 can be programmed with the number of revolutions a racking screw must undergo to move a circuit breaker between the "connect" position and the "test" position as well as the number of revolutions the racking screw must undergo to move the circuit breaker between the "test" position and the "disconnect" position. The controller 268 is also programmed to recognize the appropriate transmission for the electric switchgear being racked and to digitally limit the torque applied to the transmission by the motor 28. When the motor 28 generates a torque in excess of a predetermined value, the controller 268 shuts off the motor 28.

As illustrated in FIG. 14, the controller 268 is provided with an Ethernet port 294. The Ethernet port 294 makes it possible to download additional data into the controller 268 in the field. This can be useful, for instance, if the controller 268 is to be employed for a type of electric switchgear different from the type or types of electric switchgear for which the controller 268 is programmed.

Assuming that the controller 268 is programmed for the type of electric switchgear shown in FIGS. 1, 2 and 11 and that the motor 28 has been joined to the transmission 30, one manner of operation is as follows:

With the door 26 of the cubicle 12 open, an operator checks the current position of the circuit breaker 14. The operator then closes the door 26 and verifies that the door 26 is securely latched. The operator further ascertains that the mounting bracket 32 is correctly installed on the door 26.

Once the operator has verified that the mounting bracket 32 was properly installed on the door 26, the transmission 30 is inserted in the collar 36 of the mounting bracket 32 and locked in place by the locking pin 94. The automation cable 50 is then attached to the motor 28. Furthermore, the sensing cable 280 is connected to the controller 268 and the transmission 30 while the drive power cable 286 is attached to the controller 268 and the motor 28. The controller 268 is moved as far away as possible from the cell 10 and the power cable 274 is plugged in. The controller 268 is now switched on.

Figure 15:
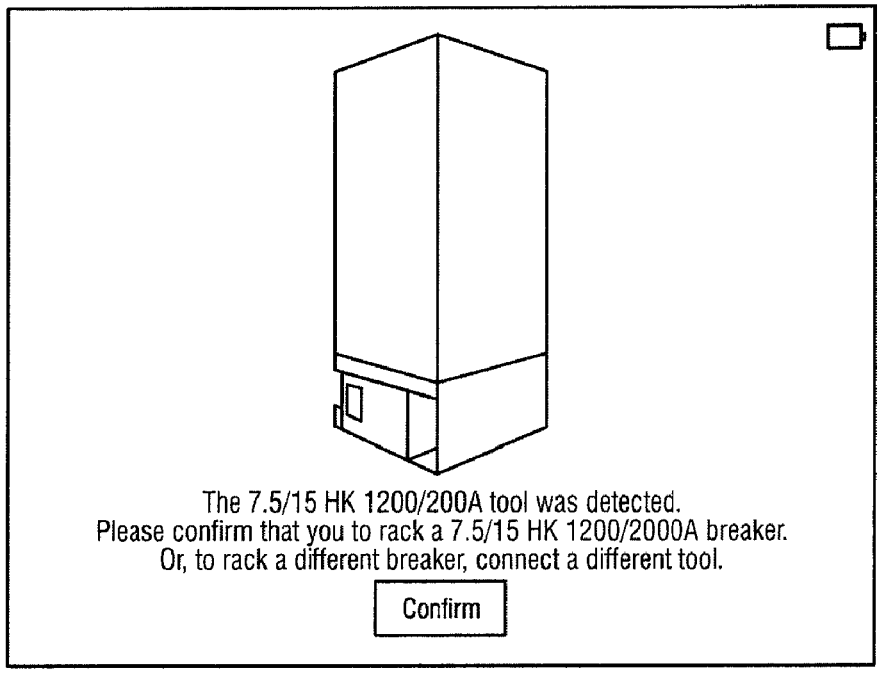
FIG. 15 shows a display appearing on a screen of the controller of FIG. 14 when the controller is activated to displace a circuit breaker.

When the controller 268 is switched on, the screen 270 of the controller 268 displays a message of the form shown in FIG. 15. The message states that the controller 268 has detected a tool or transmission of the type required to rack a circuit breaker belonging to electric switchgear having the designation 15 HK 1200A. The message may be accompanied by a picture of a cell of the electric switchgear, and the operator is requested to confirm that the tool or transmission detected by the controller 268 is the correct one for the circuit breaker to be racked. It is assumed here that the electric switchgear of FIGS. 1, 2 and 11 is 15 HK 1200A switchgear and that the transmission 30 is the proper transmission for this switchgear.

Figure 16:
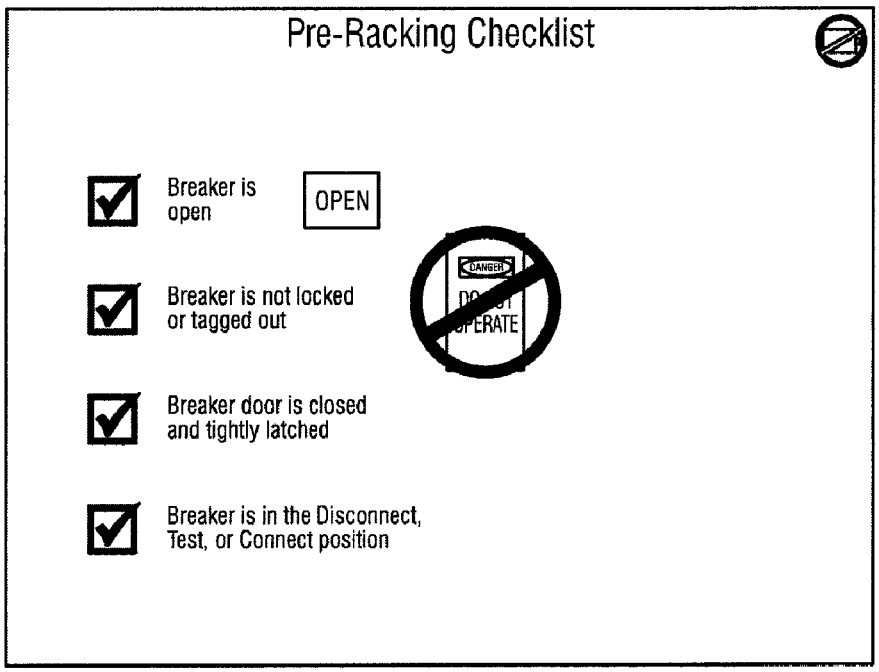
FIG. 16 shows another display appearing on the screen of the controller.

The screen 270 of the controller 268 further displays a pre-racking checklist of the form illustrated in FIG. 16. The operator is advised to check that the circuit breaker 14 is open and no LOTO is in use, that the racking tool or transmission 30 is attached to the motor 28 and that all of the cables 50, 280, 286 are connected. The operator is also advised to check that the hardware or mounting bracket 32 is attached to the door 26 of the cell 10 and that the racking tool or transmission 30 passes into the cubicle 12 of the cell 10. For the electric switchgear of FIGS. 1, 2 and 11, the operator should additionally check that the operating lever 190 for the positive interlock of the circuit breaker 14 properly engages the extension 158 and that the positive interlock moves freely. If desired, an entry on the checklist can be accompanied by one or more pictures depicting the correct condition or conditions of the item or items to be checked.

Figure 17:
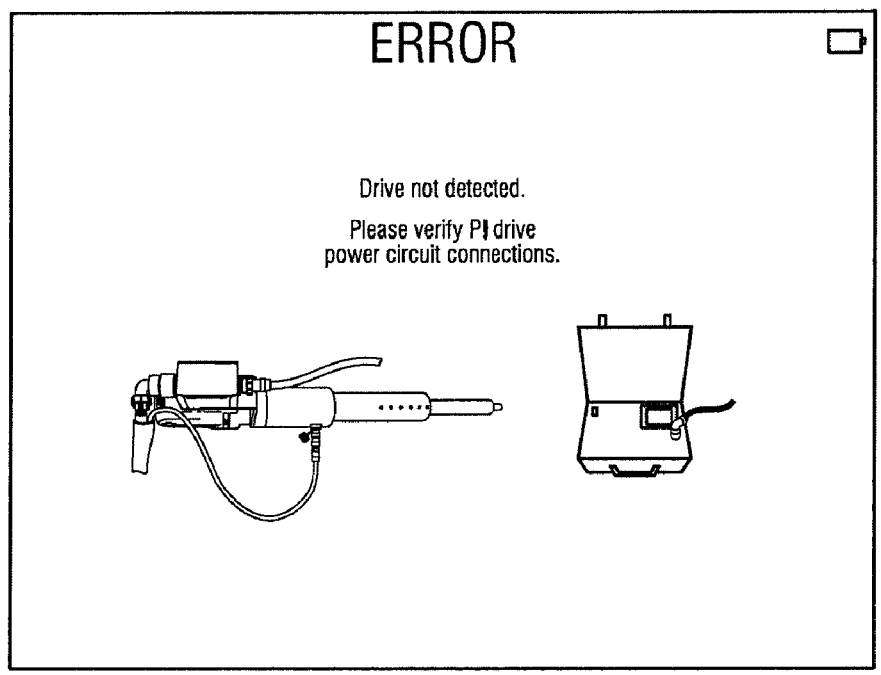
FIG. 17 shows an error message on the screen of the controller.

Should a problem go undetected by the operator, the screen 270 of the controller 268 displays an error message. An example of such an error message is shown in FIG. 17 where the controller 268 indicates that the motor or drive 28 has not been detected. The operator is requested to check the connections for the drive power cable 286, and the error message is accompanied by pictures illustrating the locations to be checked.

Figure 18:
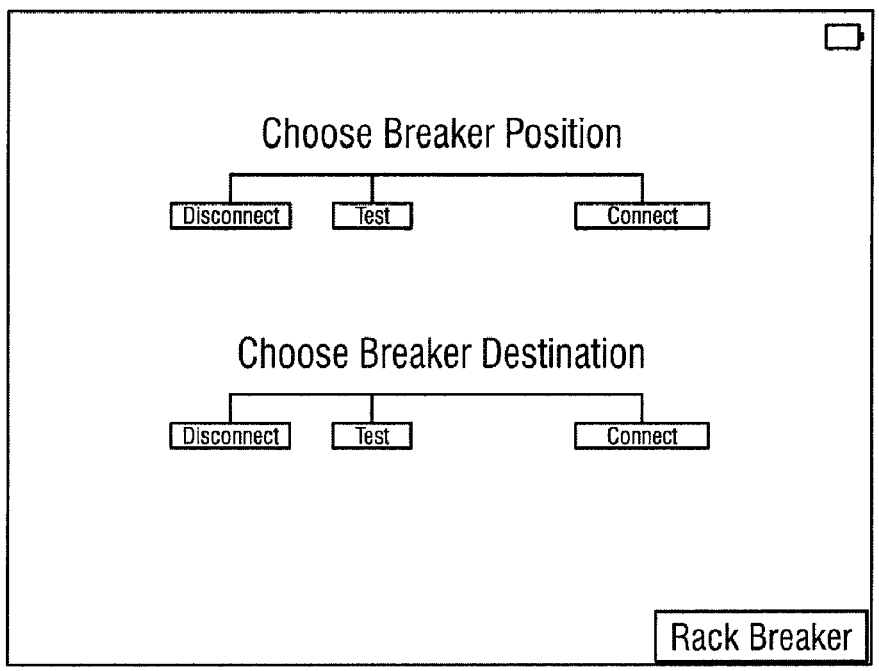
FIG. 18 shows an additional display appearing on the screen of the controller.

The screen 270 of the controller 268 additionally exhibits a display of the form shown in FIG. 18. Here, the operator is requested to enter the starting position of the circuit breaker 14 as well as the new position to which the circuit breaker 14 is to be moved. The display of FIG. 18 includes a box with the caption "Rack Breaker" and, once the starting position and new position of the circuit breaker 14 have been entered, the operator touches this box to initiate racking of the circuit breaker 14.

As outlined previously, the positive interlock for the circuit breaker 14 includes a non-illustrated pin and is movable between an engaged position, a disengaged position and an intermediate position. The pin extends into a non-illustrated arresting opening of the racking screw 20 in the engaged position, is clear of the screw 20 in the disengaged position and rests on the outer periphery of the screw 20 in the intermediate position. Moreover, the positive interlock is continuously biased towards the engaged position by a non-illustrated biasing element.

In the "connect" position, the "test" position and the "disconnect" position, the positive interlock for the circuit breaker 14 is in its engaged position and prevents the racking screw 20 from rotating. When the operator touches the box captioned "Rack Breaker", the controller 268 causes the solenoid 170 on the mounting bracket 32 to be energized. Consequently, the positive interlock is moved to its disengaged position through the agency of the interlock operating lever 190, the extension 158 and the lever 154. Upon disengagement of the positive interlock, the controller 268 activates the motor 28 which begins to rotate the racking screw 20. The racking screw 20, in turn, causes the circuit breaker 14 to begin moving.

Once the positive interlock is in its disengaged position and the racking screw 20 has begun to rotate so that the pin of the positive interlock is no longer in alignment with, and can no longer enter, the arresting opening previously occupied by the pin, the controller 268 causes the solenoid 170 to be deenergized. The positive interlock thereupon moves to its intermediate position under the action of the non-illustrated biasing element acting on the positive interlock, and the pin comes to rest on the external periphery of the racking screw 20. The pin rides on the external periphery of the racking screw 20 until the circuit breaker 14 reaches its new position. At this time, the arresting opening of the racking screw 20 corresponding to the new position of the circuit breaker 14 comes into alignment with the pin of the positive interlock and the pin is urged into such arresting opening.

Figure 19:
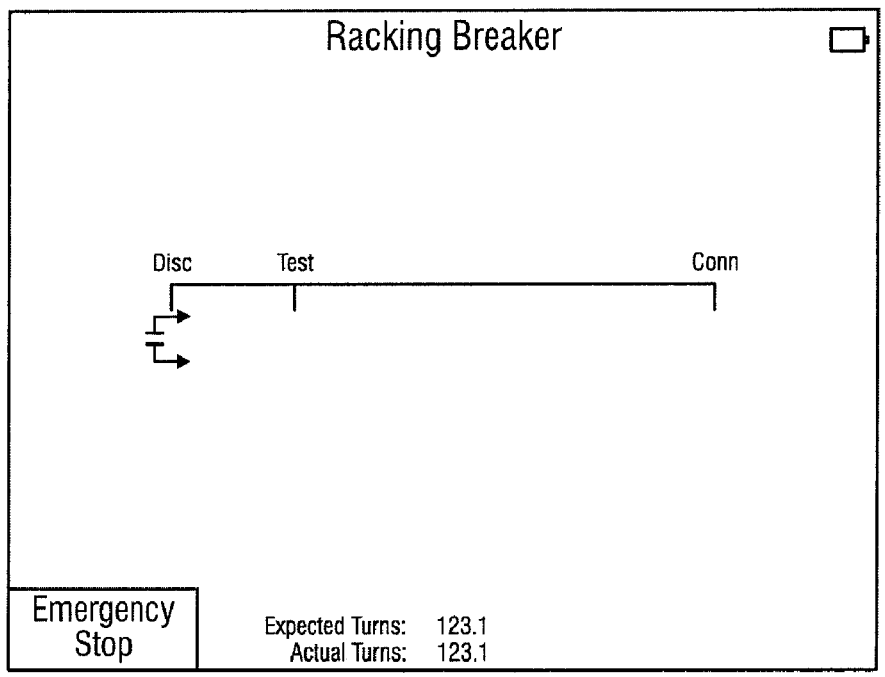
FIG. 19 shows a further display appearing on the screen of the controller.

A display of the form illustrated in FIG. 19 appears on the screen 270 of the controller 268 during racking of the circuit breaker 14. This display, which is captioned "Racking Breaker", allows the operator to track the displacement of the circuit breaker 14. To this end, the display indicates the number of revolutions or turns which the racking screw 20 is expected to undergo during movement of the circuit breaker 14 from its starting position to its new position. The display further indicates the actual number of revolutions or turns which the racking screw 20 has made at any given time.

A box in the display of FIG. 19 captioned "Emergency Stop" enables the operator to interrupt racking at any moment.

Figure 20:
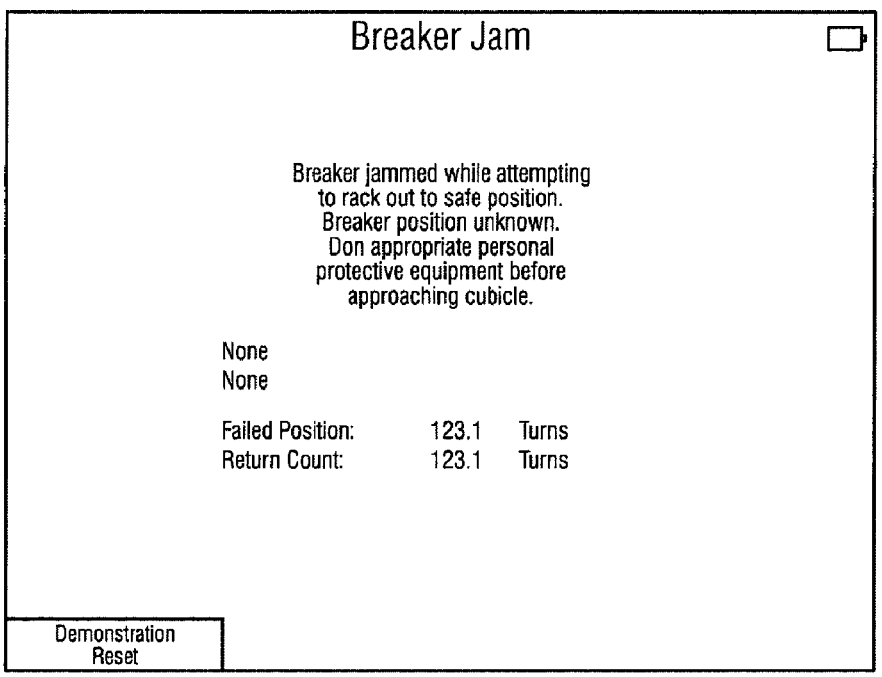
FIG. 20 shows a warning message on the screen of the controller.

Should a problem arise during racking, the screen 270 of the controller 268 displays an appropriate message. For instance, if the circuit breaker 14 jams while being racked, a message such as that in FIG. 20 appears on the screen 270.

When the actual number of revolutions undergone by the racking screw 20 equals the number expected during movement of the circuit breaker 14 from its starting position to its new position, the controller 268 deactivates the motor 28. The pin of the positive interlock enters the arresting opening of the racking screw 20 corresponding to the new position of the circuit breaker 14 and the racking screw 20 and circuit breaker 14 are held against movement. The door 26 of the cubicle 12 can now be safely opened. If racking of the circuit breaker 14 is complete, the racking system 24 can be disassembled and removed.

The transmission 30 is designed for electric switchgear of the type in which the racking screws not only rotate during racking but move axially as well. A differently designed transmission is required for electric switchgear having racking screws which do not move axially.

Figure 21:
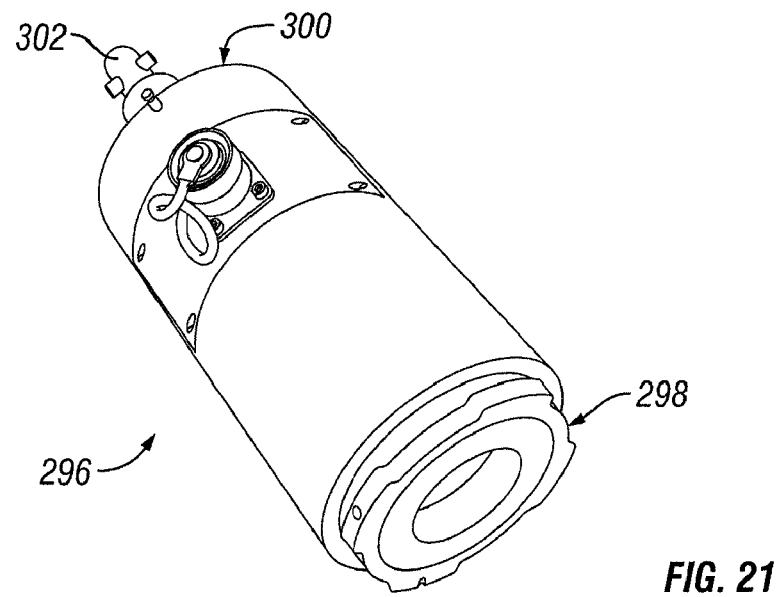
FIG. 21 is a perspective view of another transmission for use in a circuit breaker displacing system according to the invention.

FIG. 21 illustrates a transmission 296 for use with electric switchgear in which the racking screws do not move axially. The transmission 296 comprises a universal stage 298 and a specialized stage 300 which can be joined to one another in the same manner as the universal stage 52 and the specialized stage 56 of the transmission 30. Except for different remote identification generators, the universal stage 298 of the transmission 296 is identical to the universal stage 52 of the transmission 30.

The specialized stage 300 of the transmission 296 has an output shaft 302 for driving a racking screw. The output shaft 302 is rotatable like the output shaft 62 of the transmission 30 but, in contrast to the output shaft 62, the output shaft 302 is not shiftable axially. Consequently, the specialized stage 300 of the transmission 296 is simpler than the specialized stage 56 of the transmission 30.

While not visible in FIG. 21, the transmission 296 is provided with one or more threaded holes for screws which prevent insertion of the transmission 296 in a mounting bracket when the transmission 296 is the wrong transmission for the electric switchgear associated with the mounting bracket.

The transmission 296 can be coupled to the motor 28 and thus does not require a different motor than the transmission 30.

The mounting bracket 32 for the transmission 30 is designed for electric switchgear having positive interlocks. However, various types of electric switchgear lack such interlocks and simpler mounting brackets can be employed in these situations.

Figure 22:
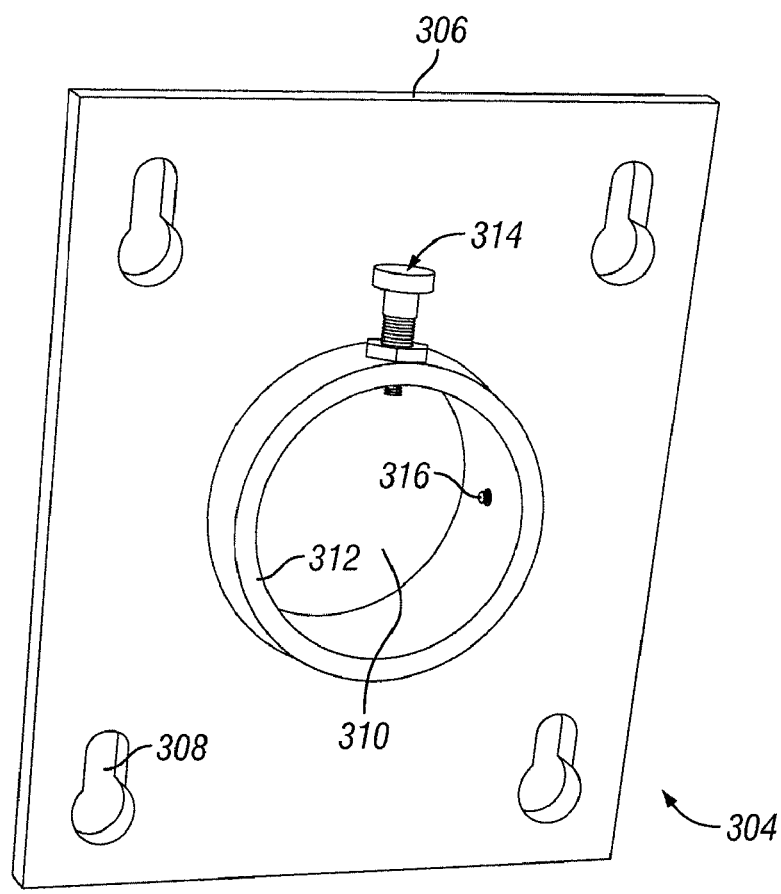
FIG. 22 is a perspective view of another mounting bracket for use in a circuit breaker displacing system according to the invention.

FIG. 22 shows a mounting bracket 304 for use with a type of electric switchgear having axially movable racking screws but no positive interlocks. The mounting bracket 304 comprises a plate or attachment element 306 having holes 308 for affixing the bracket 304 to a cubicle door. An opening 310 is formed centrally of the plate 306, and a collar or holding element 312 for holding a transmission is disposed in the central opening 310. The collar 312 is provided with a locking pin 314 which serves to prevent a transmission from rotating relative to or shifting axially of the collar 312. The collar 312 is seated in the central opening 310 via a gimbal mount which enables a transmission held by the collar 312 to adjust when a circuit breaker or racking screw deviates from its normal motion.

A screw 316 projects into the interior of the collar 312 and helps to position and secure a transmission in the collar 312. The screw 316 also functions to prevent the collar 312 from accepting a transmission which is not designed for the switchgear associated with the mounting bracket 304.

Figure 23:
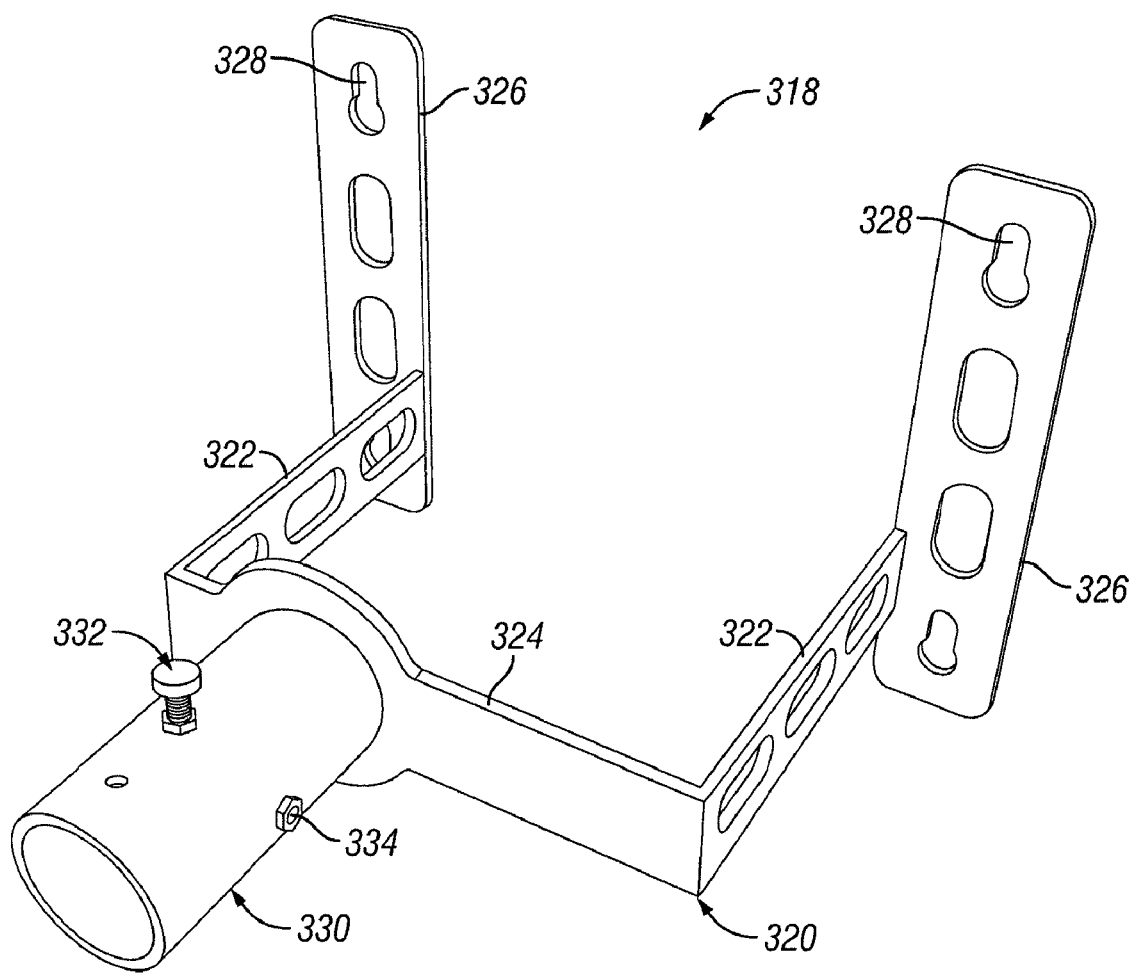
FIG. 23 is a perspective view of an additional mounting bracket for use in a circuit breaker displacing system according to the invention.

FIG. 23 illustrates a mounting bracket 318 for use with electric switchgear having neither positive interlocks nor axially movable racking screws.

The mounting bracket 318 includes a U-shaped member 320 with two parallel legs 322 and a crosspiece 324 connecting the legs 322 to one another. Each of the legs 322 has an end which is spaced from the crosspiece 324 and is attached to a mounting plate or attachment element 326. The mounting plates 326 are formed with holes 328 for securing the bracket 318 to a cubicle door.

The legs 322 of the U-shaped member 320 project to one side of the crosspiece 324, and a collar or holding element 330 for holding a transmission projects to the opposite side of the crosspiece 324. The crosspiece 324 is provided with a non-illustrated opening, and the collar 330 is fixed to the crosspiece 324 in register with this opening. The collar 330 is provided with a locking pin 332 which prevents a transmission from rotating relative to or shifting axially of the collar 330.

A screw 334 extends into the interior of the collar 330 and helps to position and secure a transmission in the collar 330. The screw 334 additionally serves to prevent the collar 330 from accepting a transmission which is not designed for the switchgear associated with the mounting bracket 318.

Figure 24:
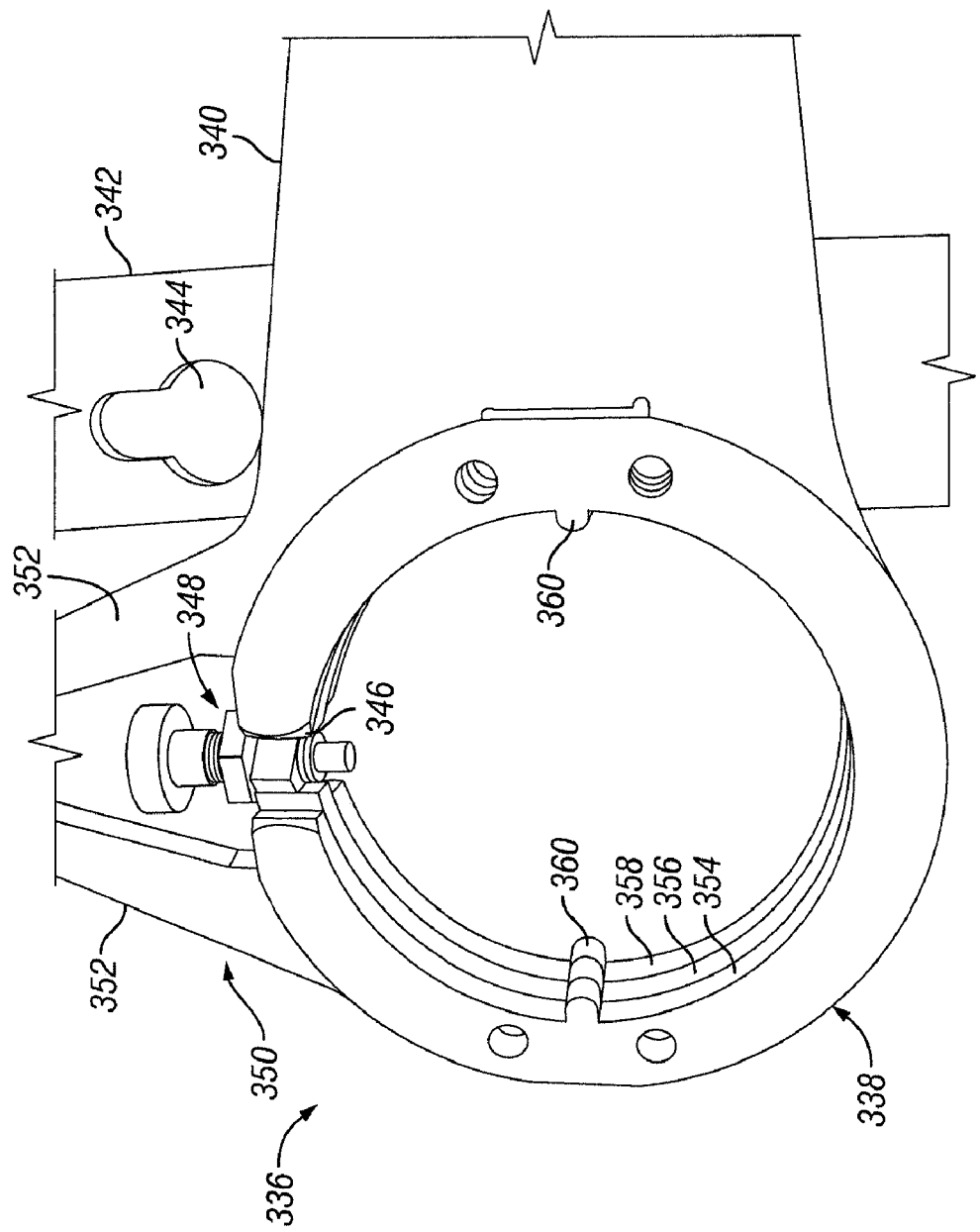
FIG. 24 is a perspective view of a further mounting bracket for use in a circuit breaker displacing system according to the invention.

Another mounting bracket 336 is shown in FIG. 24.

The mounting bracket 336 comprises a collar or holding element 338 for holding a transmission and an arm 340 projecting from the collar 338 perpendicular to the axis of the collar 338. The arm 340 supports two elongated mounting plates or attachment elements 342 (only one visible in the drawings) which extend transverse to the arm 340, and the mounting plates are formed with holes 344 for attaching the mounting bracket 336 to a cubicle door.

The collar 338 has a gap 346, and a locking pin 348 for preventing rotation of a transmission relative to or shifting of a transmission axially of the collar 338 is mounted in the gap 346. A reinforcing element 350 in the form of an inverted U is fast with the collar 338 and includes two legs 352 and a non-illustrated crosspiece joining the legs 352 to each other. One of the legs 352 sits on the outer periphery of the collar 338 to one side of the gap 346 while the other of the legs 352 sits on the outer periphery of the collar 338 to the opposite side of the gap 346. Thus, the locking pin 348 is located between the legs 352.

The collar 338 comprises three superimposed sections 354, 356 and 358. Each of the collar sections 354, 356, 358 is in the form of a ring missing a segment at the location of the gap 346. The inner periphery of each collar section 354, 356, 358 is provided with two ribs 360 which are situated at diametrically opposite locations of the respective collar section 354, 356, 358. The ribs 360 replace, and function similarly to, the screws 100,102 of the mounting bracket 32, the screw 316 of the mounting bracket 304 and the screw 334 of the mounting bracket 318. Thus, the ribs 360 help to position a transmission on the mounting bracket 336 and to prevent rotation of the transmission relative to the mounting bracket 336. Furthermore, the ribs 360 prevent the mounting bracket 336 from accepting a transmission which is not designed for the switchgear associated with the mounting bracket 336.

The ribs 360 are removable individually so that the rib pattern can be adjusted to suit particular applications.

Various modifications are possible within the meaning and range of equivalence of the appended claims.

I claim:

1. A system for remotely displacing a circuit breaker of a selected type of electrical switchgear having a selected drive member arranged to displace the circuit breaker in accordance with predetermined displacement parameters, said system comprising:

a motor for driving the drive member;

a force-transmitting member releasably connectible with said motor, said force-transmitting member being of a selected type adapted to engage the selected drive member so as to transmit force thereto and adapted to remain in engagement with the selected drive member throughout at least the major part of the range of displacement of the circuit breaker, and said force-transmitting member being provided with an identifying element for generating a signal identifying said force-transmitting member as being of said selected type of force-transmitting member;

a mounting member for mounting said force-transmitting member in a position to engage and transmit force to the selected drive member; and a control unit responsive to said signal and programmed with the predetermined displacement parameters for the circuit breaker, said control unit being adapted to cause said motor to drive said force-transmitting member based on the predetermined displacement parameters for the circuit breaker.

2. The system of claim 1 for use when the selected circuit breaker is lockable in a predetermined position with a locking device, wherein said mounting member is provided with an unlocking mechanism adapted to be coupled to the locking device, said control unit being programmed to cause said unlocking mechanism to unlock the locking device when said unlocking mechanism is coupled to the locking device and the circuit breaker is to be displaced from the predetermined position.

3. The system of claim 2, further comprising a coupling member for coupling said unlocking mechanism to the locking device, said coupling member being mountable on the locking device and adapted to be engaged by said unlocking mechanism.

4. The system of claim 1, wherein the selected drive member is rotary and said motor and said force-transmitting member are adapted to apply torque to the selected drive member, said control unit being programmed to deactivate said motor when said motor generates a torque in excess of a predetermined value.

5. The system of claim 1, wherein the selected drive member is rotary and said motor and said force-transmitting member are adapted to apply torque to the selected drive member, said motor and said force-transmitting member being provided with cooperating coupling elements for transferring torque from said motor to said force-transmitting member, and said cooperating coupling elements being adapted to prevent the torque on said force-transmitting member from exceeding a predetermined value.

6. The system of claim 1, wherein said motor and said force-transmitting member are provided with cooperating coupling elements for transferring force from said motor to said force-transmitting member; and further comprising a locking element on said motor for locking said force-transmitting member to said motor, said locking element being shiftable relative to said motor between a locked position and a released position.

7. The system of claim 6, wherein said locking element is shiftable by hand.

8. The system of claim 1, wherein said force-transmitting member is provided with a sensing device for sensing the distance moved by the circuit breaker.

9. The system of claim 1, wherein said force-transmitting member and said mounting member are provided with cooperating positioning elements for positioning said force-transmitting member and said mounting member in a predetermined relative position.

10. The system of claim 9, wherein said cooperating positioning elements include at least one positioning element which inhibits a type of force-transmitting member different than said selected type of force-transmitting member from being mounted on said mounting member.

11. The system of claim 9, wherein said mounting member is of a selected type and said cooperating positioning elements include at least one positioning element which inhibits said force-transmitting member from being mounted on a type of mounting member different than said selected type of mounting member.

12. The system of claim 9, wherein said cooperating positioning elements are adapted to prevent relative rotation of said force-transmitting member and said mounting member.

13. The system of claim 9, further comprising a locking element on said mounting member for locking said force-transmitting member to said mounting member.

14. The system of claim 1, wherein said control unit is provided with a port for downloading software into said control unit.

15. The system of claim 1, wherein said force-transmitting member comprises a shaft for engaging and driving the selected drive member, said shaft being movable in axial direction of said shaft.

16. The system of claim 1, wherein said mounting member comprises an attachment element adapted to be fixed to a surface and a holding element for holding said force-transmitting member on said mounting member, said holding element being pivotal relative to said attachment element.

17. Electrical switchgear comprising:
a circuit breaker;
a drive member arranged to displace said circuit breaker in accordance with predetermined displacement parameters;
a motor for driving said drive member;
a force-transmitting member releasably connectible with said motor, said force-transmitting member being of a selected type adapted to engage said drive member so as to transmit force thereto and adapted to remain in engagement with said drive member throughout at least the major part of the range of displacement of said circuit breaker, and said force-transmitting member being provided with an identifying element for generating a signal identifying said force-transmitting member as being of said selected type;
a mounting member for mounting said force-transmitting member in a position to engage and transmit force to said drive member; and
a control unit responsive to said signal and programmed with the predetermined displacement parameters for said circuit breaker, said control unit being adapted to cause said motor to drive said force-transmitting member based on said predetermined displacement parameters.

18. A method of displacing a circuit breaker which is movable by a drive member in accordance with predetermined displacement parameters, said method comprising the steps of:
establishing a connection between said drive member and an additional member of a selected type adapted to drive said drive member;
transmitting a signal from said additional member identifying said additional member as being of said selected type;
sensing said signal; and
automatically driving said additional member in response to said signal based on said predetermined displacement parameters.

19. The method of claim 18, wherein said circuit breaker is locked in a predetermined position prior to the driving step; and further comprising the step of automatically releasing said circuit breaker prior to the driving step.

20. The method of claim 18, wherein said drive member is rotary and said additional member and said drive member are subjected to torque during the driving step; and further comprising the step of automatically interrupting the driving step when the torque on said additional member exceeds a predetermined value.

21. The method of claim 18, further comprising the step of automatically measuring the displacement of said circuit breaker during the driving step.

22. The method of claim 18, wherein the driving step comprises controlling said additional member from a location remote from said circuit breaker.

* * * * *